US011328250B2

(12) United States Patent
Mori

(10) Patent No.: US 11,328,250 B2
(45) Date of Patent: May 10, 2022

(54) INVENTORY MANAGEMENT SERVER, INVENTORY MANAGEMENT SYSTEM, INVENTORY MANAGEMENT PROGRAM, AND INVENTORY MANAGEMENT METHOD

(71) Applicant: SUNCREER CO., LTD., Sapporo (JP)

(72) Inventor: Masato Mori, Sapporo (JP)

(73) Assignee: SUNCREER CO., LTD., Sapporo (JP)

( * ) Notice: Subject to any disclaimer, the term of this patent is extended or adjusted under 35 U.S.C. 154(b) by 104 days.

(21) Appl. No.: 16/318,505

(22) PCT Filed: Jul. 18, 2017

(86) PCT No.: PCT/JP2017/025985
§ 371 (c)(1),
(2) Date: Jan. 17, 2019

(87) PCT Pub. No.: WO2018/016494
PCT Pub. Date: Jan. 25, 2018

(65) Prior Publication Data
US 2019/0311317 A1    Oct. 10, 2019

(30) Foreign Application Priority Data

Jul. 20, 2016   (JP) .............................. JP2016-142040

(51) Int. Cl.
*G06Q 10/08* (2012.01)
*G06F 16/58* (2019.01)
(Continued)

(52) U.S. Cl.
CPC ........... *G06Q 10/087* (2013.01); *B65G 61/00* (2013.01); *G06F 3/14* (2013.01); *G06F 16/5866* (2019.01);
(Continued)

(58) Field of Classification Search
CPC ............. G06Q 10/087; G06Q 30/0639; G06Q 10/08; G06Q 10/0833; G06Q 10/06315; G06Q 20/203
See application file for complete search history.

(56) References Cited

U.S. PATENT DOCUMENTS 8,577,759 B2 * 11/2013 Solomon ................ B65G 1/137
705/30
10,318,917 B1 * 6/2019 Goldstein ............ G06Q 20/208
(Continued)

FOREIGN PATENT DOCUMENTS

JP      2000-242721 A      9/2000
JP      2009199624    *   6/2009 ............. G03B 17/24
(Continued)

OTHER PUBLICATIONS

Hideo Ohishi, "Auto-ID Solution", Monthly Automatic Recognition, Sep. 10, 2013, vol. 26, No. 10, pp. 45-51, ISSN 0915-1060 (which is cited in the Preliminary Report on Patentability of PCT/JP2017/025985, disclosed herein, therefore concise explanation of the relevance is provided).

(Continued)

*Primary Examiner* — Peter Ludwig
(74) *Attorney, Agent, or Firm* — Muncy, Geissler, Olds & Lowe, P.C.

(57) ABSTRACT

To provide an inventory management server, an inventory management system, an inventory management program, and an inventory management method which are capable of carrying out inventory management such as warehousing processing and delivery processing easily and inexpensively by using an image for identifying merchandise together with an image of the merchandise. Provided is an inventory management server 4 for carrying out inventory management using images of merchandise, the inventory management server 4 including: a warehousing data acquisition unit
(Continued)

61 which acquires warehousing data from a user terminal, the warehousing data including a merchandise basic image obtained by photographing merchandise to be warehoused, an identification information image obtained by photographing identification information on the merchandise, a warehoused quantity of the merchandise, and a warehousing date of the merchandise; and an inventory data storage unit 52 which stores the identification information image and the warehoused quantity and warehousing date of the merchandise as inventory data in association with the acquired merchandise basic image.

12 Claims, 18 Drawing Sheets

(51) Int. Cl.
  *G06F 3/14* (2006.01)
  *G06K 9/00* (2022.01)
  *G06K 9/62* (2022.01)
  *B65G 61/00* (2006.01)
  *G06F 3/0482* (2013.01)

(52) U.S. Cl.
  CPC ....... *G06K 9/00664* (2013.01); *G06K 9/6215* (2013.01); *G06Q 10/08* (2013.01); *G06F 3/0482* (2013.01)

(56) References Cited

U.S. PATENT DOCUMENTS

| | | | | |
|---|---|---|---|---|
| 10,319,173 | B2* | 6/2019 | Adelberg | G07F 9/026 |
| 10,384,869 | B1* | 8/2019 | Shiee | B65G 1/1371 |
| 10,489,742 | B2* | 11/2019 | Cheruku | G06Q 10/06315 |
| 10,625,426 | B2* | 4/2020 | Bogolea | B25J 11/008 |
| 10,789,483 | B1* | 9/2020 | Ren | G06K 9/6218 |
| 2002/0133387 | A1* | 9/2002 | Wilson | G06Q 10/08 705/338 |
| 2007/0112649 | A1* | 5/2007 | Schlabach | G06Q 10/087 705/28 |
| 2008/0077511 | A1* | 3/2008 | Zimmerman | G06Q 10/00 705/28 |
| 2013/0282522 | A1* | 10/2013 | Hassan | G06Q 10/087 705/26.9 |
| 2014/0214547 | A1* | 7/2014 | Signorelli | G06Q 30/0267 705/14.64 |
| 2015/0052027 | A1* | 2/2015 | Pavani | G06K 9/6201 705/28 |
| 2016/0171434 | A1* | 6/2016 | Ladden | G06F 3/0481 705/332 |
| 2017/0286901 | A1* | 10/2017 | Skaff | G06K 9/3241 |
| 2018/0005176 | A1* | 1/2018 | Williams | G06K 9/3233 |
| 2018/0189726 | A1* | 7/2018 | Freeman | G06Q 90/00 |
| 2019/0108474 | A1* | 4/2019 | Tripathi | G01B 21/20 |
| 2020/0111107 | A1* | 4/2020 | Herrington | G06Q 30/018 |

FOREIGN PATENT DOCUMENTS

| | | |
|---|---|---|
| JP | 2009-176121 A | 8/2009 |
| JP | 2009-199624 A | 9/2009 |
| JP | 2012-208814 A | 10/2012 |
| JP | 2014-049014 A | 3/2014 |
| JP | 2014-218313 A | 11/2014 |
| JP | 2015-125535 A | 7/2015 |
| JP | 2016-095786 A | 5/2016 |
| JP | 2016-121019 A | 7/2016 |

OTHER PUBLICATIONS

International Preliminary Report on Patentability of PCT/JP2017/025985 and English translation thereof.

* cited by examiner

Fig. 3

| PROCESSING DIVISION | SLIP NUMBER | WAREHOUSING DATE | MERCHANDISE BASIC IMAGE | FIRST IDENTIFICATION INFORMATION IMAGE | SECOND IDENTIFICATION INFORMATION IMAGE | QUANTITY | UNIT | USE-BY DATE | SUPPLIER | SALES UNIT PRICE | CATEGORY | REMARKS |
|---|---|---|---|---|---|---|---|---|---|---|---|---|
| | | | | | | | | | | | | |
| | | | | | | | | | | | | |
| | | | | | | | | | | | | |

Fig. 14

| PROCESSING DIVISION | SLIP NUMBER | WAREHOUSING DATE | MERCHANDISE BASIC IMAGE | FIRST IDENTIFICATION INFORMATION IMAGE | SECOND IDENTIFICATION INFORMATION IMAGE | QUANTITY | UNIT | USE-BY DATE | SUPPLIER | SALES UNIT PRICE | CATEGORY | REMARKS |
|---|---|---|---|---|---|---|---|---|---|---|---|---|
| 0 | 1001 | yy/mm/dd | 1001_1.jpg | 1001_2.jpg | 1001_3.jpg | 15 | kg | yy/mm/dd | COMPANY A | | POTATO | |

Fig. 18

| PROCESSING DIVISION | SLIP NUMBER | WAREHOUSING DATE | MERCHANDISE BASIC IMAGE | FIRST IDENTIFICATION INFORMATION IMAGE | SECOND IDENTIFICATION INFORMATION IMAGE | QUANTITY | UNIT | USE-BY DATE | SUPPLIER | SALES UNIT PRICE | CATEGORY | REMARKS |
|---|---|---|---|---|---|---|---|---|---|---|---|---|
| 0 | 1001 | yy/mm/dd | 1001_1.jpg | 1001_2.jpg | 1001_3.jpg | 15 | Kg | yy/mm/dd | COMPANY A | | POTATO | |
| 1 | 1001 | yy/mm/dd | | | | 3 | Kg | | | | | |
| 1 | 1001 | yy/mm/dd | | | | 2 | Kg | | | | | |

CONTINUE TO FIGURE 20

INVENTORY MANAGEMENT SERVER, INVENTORY MANAGEMENT SYSTEM, INVENTORY MANAGEMENT PROGRAM, AND INVENTORY MANAGEMENT METHOD

TECHNICAL FIELD

The present invention relates to an inventory management server, an inventory management system, an inventory management program, and an inventory management method for carrying out inventory management of merchandise by using photographs.

BACKGROUND ART

In recent years, as portable information terminals such as smart phones and tablet PCs have become widely used, there have been increasing needs for inventory management using portable information terminals such as tablet PCs, especially from small and medium enterprises and individual business owners. Therefore, inventions in which inventory management is carried out by connecting such portable information terminals and inventory management servers via the Internet have been proposed.

For example, Japanese Patent Laid-Open No. 2000-242721 proposes an invention relating to an order receiving and placing consignment management system that connects a web server center and a distribution system center to the Internet and manages status of storage and shipment of merchandise (Patent Literature 1). According to Patent Literature 1, the web server center has stored in advance information on inventory status of merchandise called a merchandise master, and the distribution system center or the like accesses the merchandise master and thereby can manage the status of storage and shipment of merchandise.

CITATION LIST

Patent Literature

Patent Literature 1
  Japanese Patent Laid-Open No. 2000-242721

SUMMARY OF INVENTION

Technical Problem

However, the invention described in Patent Literature 1 has a problem of having to create a merchandise master on a merchandise type-by-merchandise type basis. For this reason, for example, even if merchandise is the same, if a production area, variety, size, warehousing date, or use-by date is different, it is necessary to create a merchandise master for each product, and a number of merchandise masters becomes enormous. Therefore, a work burden and cost of creation, management cost after that, and the like become extremely high, and small and medium enterprises and individual business owners cannot introduce the invention easily.

Although it is conceivable to enter the production area, variety, size, warehousing date, and use-by date as remarks of the merchandise master every time merchandise is warehoused or delivered, it is very troublesome to enter them every time of warehousing and delivery in a food industry and the like where merchandise is replaced every day, and it is not realistic or widely used.

The present invention is devised to solve the above-described problem and its objective is to provide an inventory management server, an inventory management system, an inventory management program, and an inventory management method which are capable of carrying out inventory management such as warehousing processing and delivery processing easily and inexpensively by using an image for identifying merchandise together with an image of the merchandise.

Solution to Problem

An inventory management server according to the present invention is an inventory management server for carrying out inventory management by using images of merchandise in order to accomplish a task of eliminating need to create a merchandise master and thereby carrying out inventory management easily and inexpensively, the inventory management server including: a warehousing data acquisition unit which acquires warehousing data from a user terminal, the warehousing data including a merchandise basic image obtained by photographing merchandise to be warehoused, an identification information image obtained by photographing identification information on the merchandise, a warehoused quantity of the merchandise, and a warehousing date of the merchandise; and an inventory data storage unit which stores the identification information image and the warehoused quantity and warehousing date of the merchandise as inventory data in association with the acquired merchandise basic image.

As one aspect of the invention, in order to accomplish a task of using an image identifying merchandise for searching for a candidate for delivery merchandise, the inventory management server may include: a delivery merchandise image acquisition unit which acquires, from the user terminal, a delivery merchandise image obtained by photographing merchandise to be delivered or merchandise similar to the merchandise to be delivered; a similar image discrimination unit which compares the acquired delivery merchandise image with the merchandise basic image stored in the inventory data storage unit and discriminates an image similar to the delivery merchandise image; and a display control unit which causes the user terminal to display, as a candidate for delivery merchandise, the inventory data corresponding to the merchandise basic image discriminated to be similar to the delivery merchandise image.

As further one aspect of the invention, in order to accomplish a task of acquiring merchandise identification information from an image, the inventory management server may include an identification information text processing unit which converts the identification information included in the identification information image into text data by image analysis and causes the inventory data storage unit to store the identification information as the inventory data in association with the merchandise basic image.

As another aspect of the invention, in order to accomplish a task of easily entering a quantity of merchandise to be delivered, the inventory management server may include: a display control unit which causes the user terminal to display the inventory data in the inventory data storage unit as a candidate for delivery merchandise; and a quantity management unit which acquires, as a delivery quantity, a number of taps or a number of clicks of the merchandise basic image or identification information image displayed on the user terminal and causes the inventory data storage unit to store the delivery quantity as the inventory data in association with the merchandise basic image.

As further one aspect of the invention, in order to accomplish a task of switching a list of merchandise including an image for identifying merchandise in an easily visible manner, the inventory management server may include a display control unit which causes the user terminal to display the inventory data in the inventory data storage unit as a candidate for delivery merchandise, and the display control unit may have a list display mode to cause the user terminal to display a list of all of the merchandise basic image and the identification information image and a switching display mode to cause the user terminal to display either the merchandise basic image or identification information image and switch the displayed image to another image every time the displayed image is tapped or swiped.

As another aspect of the invention, in order to accomplish a task of carrying out time limit management of merchandise by using an image for identifying the merchandise, the inventory management server may include a time limit management unit which, when a merchandise basic image or an identification information image is transmitted to a user terminal, if a predetermined time limit set to corresponding merchandise is close, causes the user terminal to superimpose and display such notice on the merchandise basic image or identification information image.

As further one aspect of the invention, in order to accomplish a task of easily carrying out sales management of merchandise by using an image for identifying the merchandise, the inventory management server may include: a display control unit which causes the user terminal to display the inventory data in the inventory data storage unit as a candidate for delivery merchandise; and a sales management unit which acquires a delivery quantity of the merchandise displayed on the user terminal and a sales unit price of the merchandise from the user terminal and causes the inventory data storage unit to store them in association with the merchandise basic image.

As another aspect of the invention, in order to accomplish a task of easily performing ordering processing of merchandise by using an image for identifying the merchandise, the inventory management server may include an ordering management unit which acquires the identification information image of merchandise to be ordered and an order quantity of the merchandise from the user terminal and causes an order data storage unit to store the order quantity as order data in association with the identification information image.

As further one aspect of the invention, in order to accomplish a task of performing warehousing processing of each product or the like during one work by using an image obtained by photographing multiple types of merchandise or multiple pieces of identification information, the inventory management server may include a warehousing merchandise image extraction unit which extracts the merchandise basic image or identification information image for each merchandise type from the merchandise basic image or identification information image by image analysis if the merchandise basic image or identification information image acquired by the warehousing data acquisition unit includes multiple types of merchandise or multiple pieces of identification information.

As another aspect of the invention, in order to accomplish a task of performing delivery processing of each product during one work by using an image obtained by photographing multiple types of merchandise, the inventory management server may include a delivery merchandise image extraction unit which extracts the delivery merchandise image for each merchandise type from the delivery merchandise image by image analysis if the delivery merchandise image acquired by the delivery merchandise image acquisition unit includes multiple types of merchandise.

An inventory management system according to the present invention includes the inventory management server and a user terminal which performs warehousing processing for warehousing merchandise to the inventory management server and delivery processing for delivering merchandise from the inventory management server.

An inventory management program according to the invention is an inventory management program for carrying out inventory management by using images of merchandise and causes a computer to function as: a warehousing data acquisition unit which acquires warehousing data from a user terminal, the warehousing data including a merchandise basic image obtained by photographing merchandise to be warehoused, an identification information image obtained by photographing identification information on the merchandise, a warehoused quantity of the merchandise, and a warehousing date of the merchandise; and an inventory data storage unit which stores the identification information image and the warehoused quantity and warehousing date of the merchandise as inventory data in association with the acquired merchandise basic image.

An inventory management method according to the invention is an inventory management method for carrying out inventory management by using images of merchandise and includes: a warehousing data acquisition step of acquiring warehousing data from a user terminal, the warehousing data including a merchandise basic image obtained by photographing merchandise to be warehoused, an identification information image obtained by photographing identification information on the merchandise, a warehoused quantity of the merchandise, and a warehousing date of the merchandise; and an inventory data storage step of storing the identification information image and the warehoused quantity and warehousing date of the merchandise as inventory data in association with the acquired merchandise basic image.

Advantageous Effects of Invention

According to the invention, it is possible to carry out inventory management such as warehousing processing and delivery processing easily and inexpensively by using an image for identifying merchandise together with an image of the merchandise.

BRIEF DESCRIPTION OF DRAWINGS

FIG. 3 is an image diagram of inventory data stored in an inventory data storage unit in the embodiment.

FIG. 14 is an image diagram of inventory data stored in the inventory data storage unit after the warehousing processing in the embodiment.

FIG. 18 is an image diagram of inventory data stored in the inventory data storage unit after the delivery processing in the embodiment.

DESCRIPTION OF EMBODIMENTS

Hereinafter, one embodiment of an inventory management server, an inventory management system, an inventory management program, and an inventory management method according to the present invention will be described with reference to the drawings.

Figure 1:
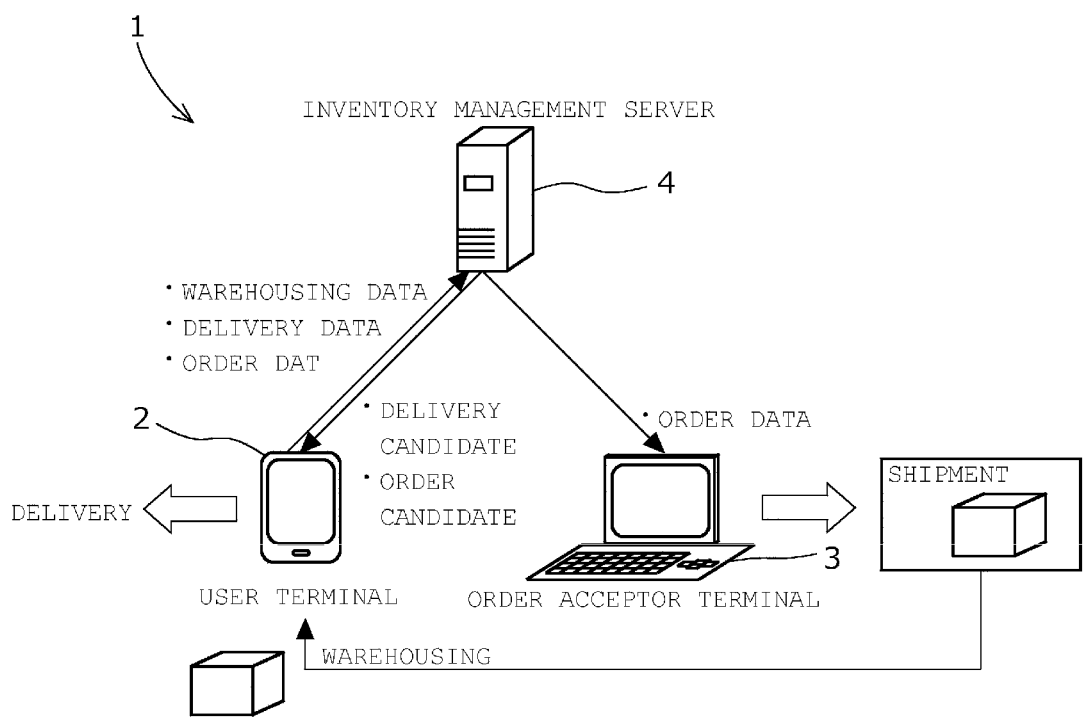
FIG. 1 is a conceptual diagram illustrating one embodiment of inventory management systems according to the present invention.
Figure 2:
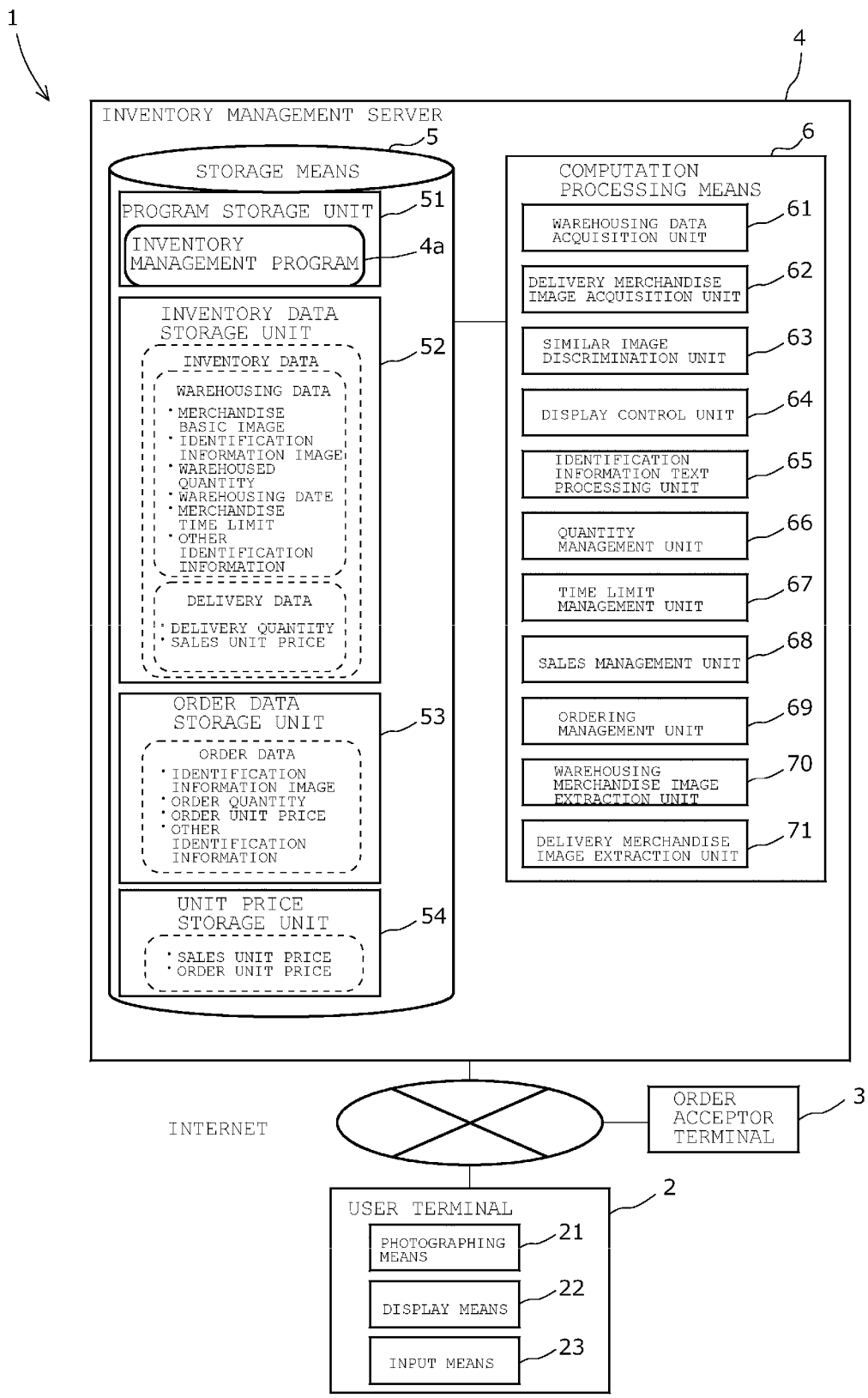
FIG. 2 is a block diagram illustrating an inventory management system of the embodiment.

As shown in FIGS. 1 and 2, an inventory management system 1 of the embodiment includes a user terminal 2, an order acceptor terminal 3, and an inventory management server 4 which carries out inventory management of merchandise on the basis of various data entered by the user terminal 2. Each configuration will be described below in detail.

The user terminal 2 of the embodiment is an information terminal for accessing the inventory management server 4 via the Internet and performing warehousing processing, delivery processing, inventory checking processing, sales processing, ordering processing, and the like, and is exemplified by a tablet PC or smart phone. The user terminal 2 of the embodiment includes photographing means 21, display means 22, and input means 23, as shown in FIG. 2.

The photographing means 21 is for taking images such as a merchandise basic image and an identification information image used for inventory management of merchandise and a delivery merchandise image for searching for the merchandise, and implemented by, for example, a digital camera function. The merchandise basic image, the identification information image, and the delivery merchandise image taken by the photographing means 21 may be any of a still image and moving image.

The display means 22 is for displaying a basic merchandise image, an identification information image, and the like when a variety of processing involved in inventory management is performed, and is composed of a liquid crystal display or the like. The display means 22 of the user terminal 2 is composed of a touch panel liquid crystal display and also serves as the input means 23.

The input means 23 is for operating the user terminal 2 and composed of a touch panel, keyboard, mouse, and the like.

The order acceptor terminal 3 is an information terminal for accessing the inventory management server 4 via the Internet and acquiring order information, and exemplified by a desktop PC or laptop PC.

The inventory management server 4 is for carrying out inventory management by acquiring warehousing data, delivery data, and order data entered by the user terminal 2, and mainly composed of storage means 5 which stores an inventory management program 4a, various data, and the like, and computation processing means 6 which acquires various data from the storage means 5 and the user terminal 2 and performs computation processing, as shown in FIG. 2.

The storage means 5 is composed of a ROM, RAM, hard disk, flash memory, and the like, and functions as a working area when the computation processing means 6 executes computation in addition to storing various data. The storage means 5 in the embodiment mainly includes a program storage unit 51 storing the inventory management program 4a, an inventory data storage unit 52 storing warehousing data, delivery data, and the like of merchandise, an order data storage unit 53 storing order data for ordering merchandise, and a unit price storage unit 54 storing sales unit prices and order unit prices.

In the program storage unit 51, the inventory management program 4a of the embodiment is installed. Then, the computation processing means 6 is configured to execute the inventory management program 4a and cause the computer or the like to function as the inventory management server 4 by making it function as later-described various units.

A utilization form of the inventory management program 4a is not limited to the above-described configuration. For example, the inventory management program 4a may be stored in a computer-readable non-transitory recording medium such as a CD-ROM or USB memory, directly read out from the recording medium, and executed. Also, the inventory management program 4a may be used from an external server or the like by cloud computing method, ASP (Application Service Provider) method, or the like.

The inventory data storage unit 52 mainly stores, as inventory data, warehousing data including a merchandise basic image, an identification information image, a warehoused quantity, a warehousing date, merchandise time limit, and other identification information acquired by warehousing processing, and delivery data including a delivery quantity and a sales unit price acquired by delivery processing or the like. The inventory data storage unit 52 in the embodiment is configured to store various data in association with a merchandise basic image, the various data including a processing division, slip number, date, the merchandise basic image, a first identification information image, a second identification information image, quantity, unit, use-by date, supplier, sales unit price, category, remarks, and the like, as shown in FIG. 3.

The processing division here is for distinguishing whether data is entered by either warehousing processing or delivery processing, and in the embodiment, data with 0 is managed as warehousing data entered by the warehousing processing and data with 1 is managed as delivery data entered by the delivery processing.

The order data storage unit 53 is for storing an identification information image of merchandise and an order quantity of the merchandise relating to the identification information image. In the embodiment, it is configured to store the order quantity, order unit price, other identification information, and the like in association with the identification information image, as shown in FIG. 2.

The unit price storage unit 54 is for storing a sales unit price and an order unit price, and in the embodiment, stores a sales unit price and an order unit price relating to merchandise in association with a merchandise basic image, merchandise category, and the like.

Next, the computation processing means 6 will be described. The computation processing means 6 of the inventory management server 4 is composed of a CPU (Central Processing Unit) and the like, and configured to execute the inventory management program 4*a* installed in the storage means 5, and thereby to cause the computer as the inventory management server 4 to function as a warehousing data acquisition unit 61, a delivery merchandise image acquisition unit 62, a similar image discrimination unit 63, a display control unit 64, an identification information text processing unit 65, a quantity management unit 66, a time limit management unit 67, a sales management unit 68, an ordering management unit 69, a warehousing merchandise image extraction unit 70, and a delivery merchandise image extraction unit 71, as shown in FIG. 2.

The warehousing data acquisition unit 61 is for acquiring warehousing data on merchandise to be warehoused entered by the user terminal 2 and causing the inventory data storage unit 52 to store the warehousing data as inventory data, and configured to acquire warehousing data from the user terminal 2, the warehousing data including a merchandise basic image obtained by photographing the merchandise to be warehoused, an identification information image obtained by photographing identification information on the merchandise, a warehoused quantity of the merchandise, a warehousing date of the merchandise, and the like. The merchandise basic image and identification information image obtained at this time may be any of a still image and moving image. In the embodiment, two images of a first identification information image and a second identification information image are obtained as the identification information image. Furthermore, in the embodiment, together with basic inventory data, detailed data such as a supplier of the merchandise and a category of the merchandise entered by the user terminal 2 is also acquired.

A number of identification information images is not particularly limited, and may be selected appropriately from a necessary number as long as they can identify. A merchandise basic image may include multiple types of merchandise in one still image or one moving image, and in the same manner, an identification information image may include multiple pieces of identification information in one still image or one moving image. Furthermore, warehousing data is not limited to the above-described various data and may be selected appropriately from, for example, text data made up of sentences such as notes of merchandise, sound data made by voice input of features of the merchandise, or the like. An acquisition method of a warehoused quantity is not limited to the method of acquiring the quantity entered by the input means 23 of the user terminal 2, and for example, if a quantity of merchandise included in a merchandise basic image coincides with a warehoused quantity, the warehousing merchandise image extraction unit 70 may make image analysis of the merchandise basic image and acquire a warehoused quantity for each merchandise type as described later.

In order to cause the inventory data storage unit 52 to store an acquired merchandise basic image with an arbitrary file name, the warehousing data acquisition unit 61 is configured to automatically allocate a number which increments every time warehousing data is acquired, and have the merchandise basic image stored with a file name in which "_1" is added at the end of the number, as shown in FIG. 14. In addition, a first identification information image and a second identification information image are made to be stored with file names in which "_2" and "_3" are added at the end of the number respectively in order to associate them with the merchandise basic image. The number is to be stored in the inventory data storage unit 52 as a slip number in the inventory data.

The file name of the merchandise basic image is not limited to automatically allocated one, and may be selected appropriately from any figure, text data, or the like entered by the user terminal 2.

The delivery merchandise image acquisition unit 62 is for acquiring an image used when the similar image discrimination unit 63 to be described next searches the inventory data stored in the inventory data storage unit 52 for merchandise to be delivered, and configured to acquire, from the user terminal 2, a delivery merchandise image obtained by photographing merchandise to be delivered or merchandise similar to the merchandise to be delivered. At this time, the delivery merchandise image may be an image of merchandise photographed by the photographing means 21 of the user terminal 2 or an image similar to the merchandise, and may be an image or the like similar to the merchandise retrieved using a browser or the like after connection to the Internet. In addition, the delivery merchandise image may be any of a still image and moving image.

The similar image discrimination unit 63 is for determining whether images are similar to each other by image analysis using an artificial intelligence (AI) function, and configured to compare the acquired delivery merchandise image with the merchandise basic image stored in the inventory data storage unit 52 and discriminate an image similar to the delivery merchandise image. In addition, both of the compared delivery merchandise image and the merchandise basic image may be any of a still image and moving image.

Figure 4:
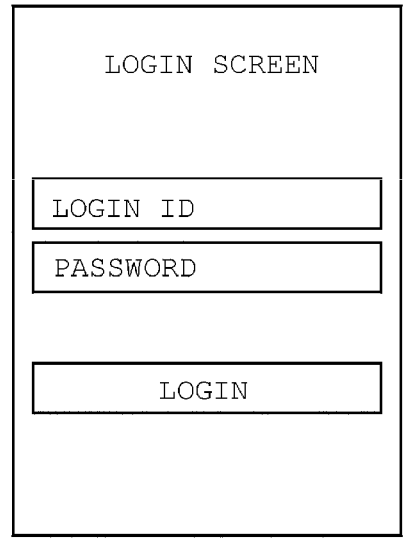
FIG. 4 is a diagram illustrating a login screen of a user terminal in the embodiment.
Figure 5:
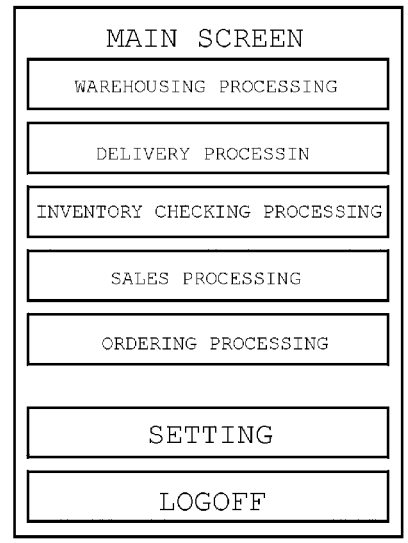
FIG. 5 is a diagram illustrating a main screen of the user terminal in the embodiment.

The display control unit 64 has a function of causing the user terminal 2 to display a predetermined screen in response to access by the user terminal 2, and is configured to transmit data to cause the user terminal 2 to display the login screen or main screen to the user terminal 2 as shown in FIGS. 4 and 5.

The display control unit 64 is configured to cause the user terminal 2 to display the inventory data in the inventory data storage unit 52 according to need of each processing, for example, causing the user terminal 2 to display, as a candidate for delivery merchandise, inventory data relating to a merchandise basic image discriminated to be an image similar to the delivery merchandise image by the similar image discrimination unit 63.

The display control unit 64 is further configured to be able to freely switch between the list display mode and the switching display mode when the inventory data displayed on the user terminal 2 is displayed as a list.

Figure 6:
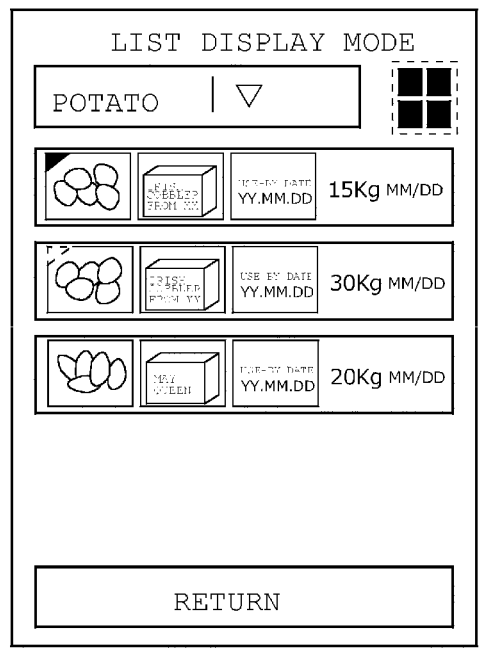
FIG. 6 is a diagram illustrating a list display mode screen of the user terminal in the embodiment.

The list display mode is a mode to facilitate comparison with other inventory data by displaying a list of a plurality of images stored in the inventory data on a screen and is made to cause the user terminal 2 to display a list of the merchandise basic image and the identification information image as shown in FIG. 6.

Figure 7:
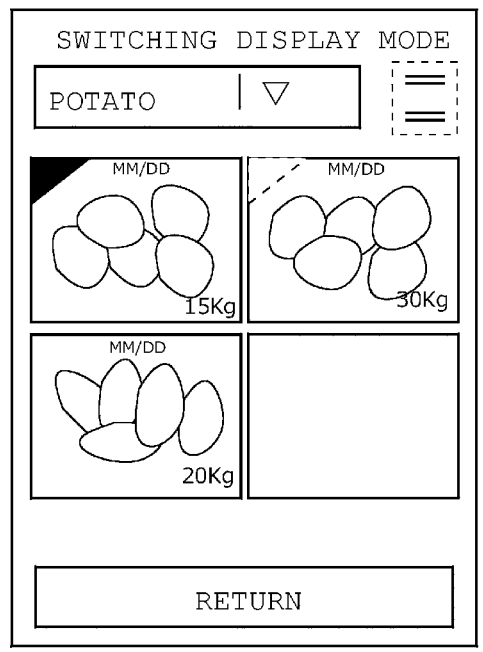
FIG. 7 is a diagram illustrating a switching display mode screen of the user terminal in the embodiment.
Figure 8:
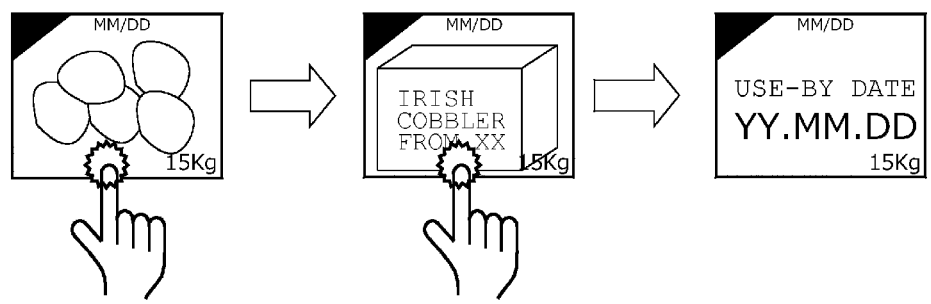
FIG. 8 is a schematic diagram illustrating switching operation of a switching display mode of the user terminal in the embodiment.

The switching display mode is a mode to display each image stored in the inventory data in a larger size to make it easy to see and made to cause the user terminal 2 to display either the merchandise basic image or identification information image as shown in FIG. 7. At this time, as shown in FIG. 8, every time the displayed image is tapped or swiped, it is switched and another image is to be displayed.

In other processing, a screen which the display control unit 64 causes the display means 22 of the user terminal 2 to display will be described together with explanation of each processing described later.

The identification information text processing unit 65 is for entering text data relating to identification information without using the input means such as the keyboard, and configured to convert identification information included in the identification information image into text data by image analysis using the AI function, and store the identification information as the inventory data in the inventory data storage unit 52. In the embodiment, the identification information text processing unit 65 is configured to convert a year, month, and day concerning the use-by date of merchandise included in the second identification information image into text data by image analysis and store them in an item of the use-by date of the inventory data storage unit 52.

The quantity management unit 66 is mainly for acquiring a delivery quantity entered by the user terminal 2 and causing the inventory data storage unit 52 to store it, and in the embodiment, the delivery quantity can be entered by three input methods.

A first input method is a method of simply inputting by using an image for identifying merchandise, and made to obtain, as the delivery quantity, the number of taps or the number of clicks of a merchandise basic image or identification information image displayed on the user terminal 2 by the display control unit 64 in the delivery processing.

Figure 9:
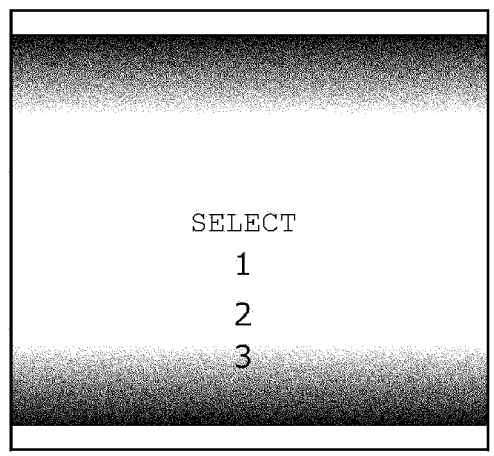
FIG. 9 is a schematic diagram illustrating a screen on which a delivery quantity is entered using a table at the user terminal in the embodiment.

A second input method is a method of having a table in which numerical values are written in advance displayed as shown in FIG. 9 and letting a user select a numerical value at will from the table.

A third input method is a method of entering a numerical value by using the keyboard or the like although it is not shown.

In the embodiment, the user can select a method at will from the three input methods.

An acquisition method of the delivery quantity is not limited to the method of acquiring the quantity entered by the input means 23 of the user terminal 2, and, for example, if a quantity of merchandise included in a delivery merchandise image coincides with a delivery quantity, the delivery merchandise image extraction unit 71 may make image analysis of the delivery merchandise image and acquire a delivery quantity for each merchandise type.

The quantity management unit 66 is configured to calculate an inventory quantity by subtracting a delivery quantity from a warehoused quantity. In the embodiment, the inventory quantity is to be calculated when the inventory data is displayed on the user terminal 2.

Timing to calculate the inventory quantity is not limited to when the inventory data is displayed on the user terminal 2, and may be calculated when the delivery quantity is acquired. In addition, the calculated inventory quantity may be stored in the inventory data storage unit 52 as the inventory data.

The time limit management unit 67 is for informing that time limit of merchandise is close, and configured, if a predetermined time limit set to merchandise is close when the merchandise basic image or identification information image is transmitted to the user terminal 2 as the inventory data, to cause the user terminal 2 to superimpose and display such notice on the merchandise basic image or identification information image.

Specifically, as shown in FIGS. 6-8, a display of a yellow triangle is superimposed on a position indicated by a dotted line at an upper left corner of the merchandise basic image or identification information image during a period from a use-by date stored as the time limit of merchandise to a predetermined number of days before it, for example, a period from the day of the use-by date to 7 days before it, and a display of a red triangle is superimposed on the same position of the merchandise basic image or identification information image when the use-by date has passed. At this time, the display of the triangle may be superimposed so as to hide the image or overlaid.

The shape and color of the display superimposed on the screen when the time limit is displayed are not particularly limited, and may be selected appropriately from shapes, colors, and the like that do not interfere with visibly recognizing merchandise included in the merchandise basic image and identification information included in the identification information image.

The sales management unit 68 is for making it possible to use the inventory management server 4 as a server for a point of sale (POS) system. The sales management unit 68 acquires the delivery quantity of the merchandise displayed on the user terminal 2 from the user terminal 2 or the delivery merchandise image extraction unit 71, and acquires a sales unit price of the merchandise from the user terminal 2 or the unit price storage unit 54 of the inventory management server 4. If the sales unit price is acquired from the unit price storage unit 54, the sales management unit 68 acquires it by image analysis or text retrieval of the merchandise basic image and category stored in association with the delivery merchandise. Then, the sales management unit 68 is configured to cause the inventory data storage unit 52 to store the acquired delivery quantity and the sales unit price in association with the merchandise basic image. In the embodiment, the sales unit price is entered when the delivery quantity is entered by the user terminal 2.

The input of the sales unit price is not limited to when the delivery quantity is entered, and may be entered by including it in the warehousing data at the time of warehousing The ordering management unit 69 is for performing ordering processing of ordering merchandise for merchandise replenishment when the quantity of the merchandise decreases. The ordering management unit 69 acquires, from the user terminal 2, the identification information image of merchandise to be ordered, and acquires an order quantity of the merchandise from the user terminal 2 or warehousing merchandise image extraction unit 70. The ordering management unit 69 in the embodiment acquires an order unit price of the merchandise by making image analysis or text retrieval of the merchandise basic image and category stored in association with the merchandise to be ordered from the unit price storage unit 54. The ordering management unit 69 is configured to cause the order data storage unit 53 to store the acquired order quantity and order unit price as order data in association with the identification information image. In the embodiment, the identification information image taken by the user terminal 2 during the ordering processing, the order quantity entered by the user terminal 2, and the order unit price acquired by image analysis or text retrieval from the unit price storage unit 54 are acquired.

The identification information image is not limited to what is taken during the ordering processing, and may be an identification information image transmitted by the display control unit 64 to cause the user terminal 2 to display it.

The warehousing merchandise image extraction unit 70 is for extracting, if the merchandise basic image or identification information image acquired by the warehousing data acquisition unit 61 includes multiple types of merchandise or multiple pieces of identification information, the merchandise basic image or identification information image for each merchandise type from the merchandise basic image or identification information image by image analysis. The warehousing merchandise image extraction unit 70 in the embodiment is configured to determine whether or not the merchandise basic image or identification information image acquired by the warehousing data acquisition unit 61 includes multiple types of merchandise or multiple pieces of identification information by image analysis based on an image recognition technique and the like using the AI function and extract the merchandise basic image or identification information image for each merchandise type by image analysis if it is determined that multiple types of merchandise or multiple pieces of identification information are included.

In the warehousing merchandise image extraction unit 70, the merchandise basic image or identification information image acquired by the warehousing data acquisition unit 61 may be any of a still image and moving image. For example, as shown in FIG. 10, if the merchandise basic image acquired by the warehousing data acquisition unit 61 is a still image, the warehousing merchandise image extraction unit 70 is configured to extract multiple types of merchandise ("potatoes" and "carrots") included in the merchandise basic image on a merchandise type-by-merchandise type basis by image analysis using the AI function.

Figure 11:
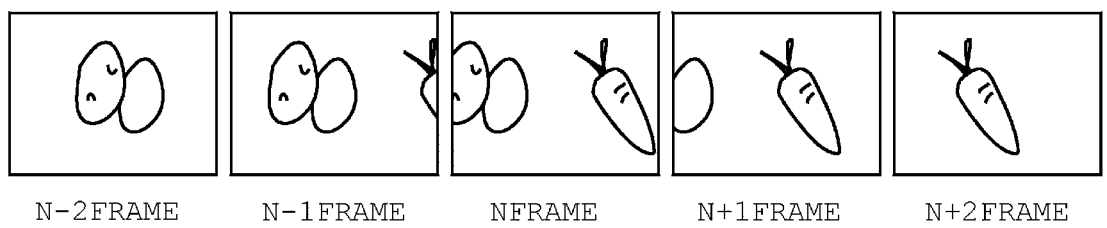
FIG. 11 is a diagram indicating frames from an N−2 frame to an N+2 frame of a merchandise basic image or delivery merchandise image composed of a moving image obtained by photographing "potatoes" and "carrots" in the embodiment.

As shown in FIG. 11, if the merchandise basic image acquired by the warehousing data acquisition unit 61 is a moving image, the warehousing merchandise image extraction unit 70 is configured to extract multiple types of merchandise ("potatoes" and "carrots") included in the moving image by making image analysis of frame images constituting the moving image. For example, because an N frame image indicating an Nth frame image includes "potatoes" and "a carrot," merchandise can be extracted for each merchandise type by making image analysis of the N frame image. Alternatively, because an N−2 frame image includes "potatoes" and an N+2 frame image includes "a carrot," merchandise can be extracted for each merchandise type by making image analysis of each of the N−2 frame image and N+2 frame image.

Figure 10:
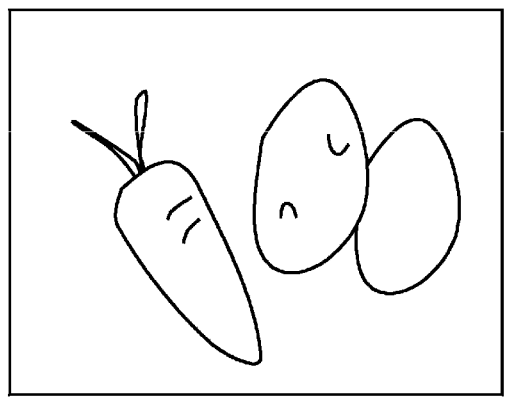
FIG. 10 is a diagram illustrating a merchandise basic image or delivery merchandise image composed of a still image obtained by photographing "potatoes" and "carrots" in the embodiment.

The warehousing merchandise image extraction unit 70 in the embodiment is configured to be able to extract a quantity for each merchandise type by image analysis, and can extract a fact that the quantity of "potatoes" is two and the quantity of "carrots" is one, for example, if it makes image analysis of the still image or moving image shown in FIG. 10 or 11.

The same applies to the identification information image, and if an identification information image acquired by the warehousing data acquisition unit 61 is a still image, each of multiple pieces of identification information included in the identification information image can be extracted by image analysis. On the other hand, if an identification information image acquired by the warehousing data acquisition unit 61 is a moving image, identification information can be extracted by making image analysis of each of frame images constituting the moving image.

If still images and moving images include both of merchandise and identification information, the warehousing merchandise image extraction unit 70 can extract the merchandise basic image and identification information image from one still image or one moving image.

The warehousing merchandise image extraction unit 70 in the embodiment determines whether or not a merchandise basic image or identification information image includes multiple types of merchandise or multiple pieces of identification information and then performs extraction processing, but it is not limited to this, and, for example, the user may input in advance whether each image includes multiple types of merchandise or multiple pieces of identification information via the user terminal 2, and the warehousing merchandise image extraction unit 70 may perform extraction processing if it is input that it includes.

If a delivery merchandise image acquired by the delivery merchandise image acquisition unit 62 includes multiple types of merchandise, the delivery merchandise image extraction unit 71 is for extracting the delivery merchandise image for each merchandise type from the delivery merchandise image by image analysis. The delivery merchandise image extraction unit 71 in the embodiment is configured to determine whether a delivery merchandise image acquired by the delivery merchandise image acquisition unit 62 includes multiple types of merchandise by image analysis based on the image recognition technique and the like using the AI function, and extract the delivery merchandise image for each merchandise type by image analysis if it is determined that multiple types of merchandise are included.

The delivery merchandise image acquired by the delivery merchandise image extraction unit 71 at this time may be any of a still image and a moving image in the same manner as the merchandise basic image and the identification information image at the warehousing merchandise image extraction unit 70. Therefore, as shown in FIG. 10, if a delivery merchandise image acquired by the delivery merchandise image acquisition unit 62 is a still image, the delivery merchandise image extraction unit 71 can extract multiple types of merchandise ("potatoes" and "carrots") included in the delivery merchandise image on a merchandise type-by-merchandise type basis by image analysis. As shown in FIG. 11, if a delivery merchandise image acquired by the delivery merchandise image acquisition unit 62 is a moving image, the delivery merchandise image extraction unit 71 can extract multiple types of merchandise ("potatoes" and "carrots") included in the moving image by making image analysis of frame images constituting the moving image.

The delivery merchandise image extraction unit 71 in the embodiment is configured to be able to extract a quantity for each merchandise type by image analysis in the same manner as the warehousing merchandise image extraction unit 70, and can extract, for example, a fact that the quantity of "potatoes" is two and the quantity of "carrots" is one if it makes image analysis of the still image or moving image shown in FIG. 10 or 11.

The delivery merchandise image extraction unit 71 may perform extraction processing if it is input via the user terminal 2 that the delivery merchandise image includes multiple types of merchandise.

Next, action of each configuration of the inventory management server 4, the inventory management system 1, and the inventory management program 4a of the embodiment will be described together with the inventory management method.

(Warehousing Processing)

Figure 12:
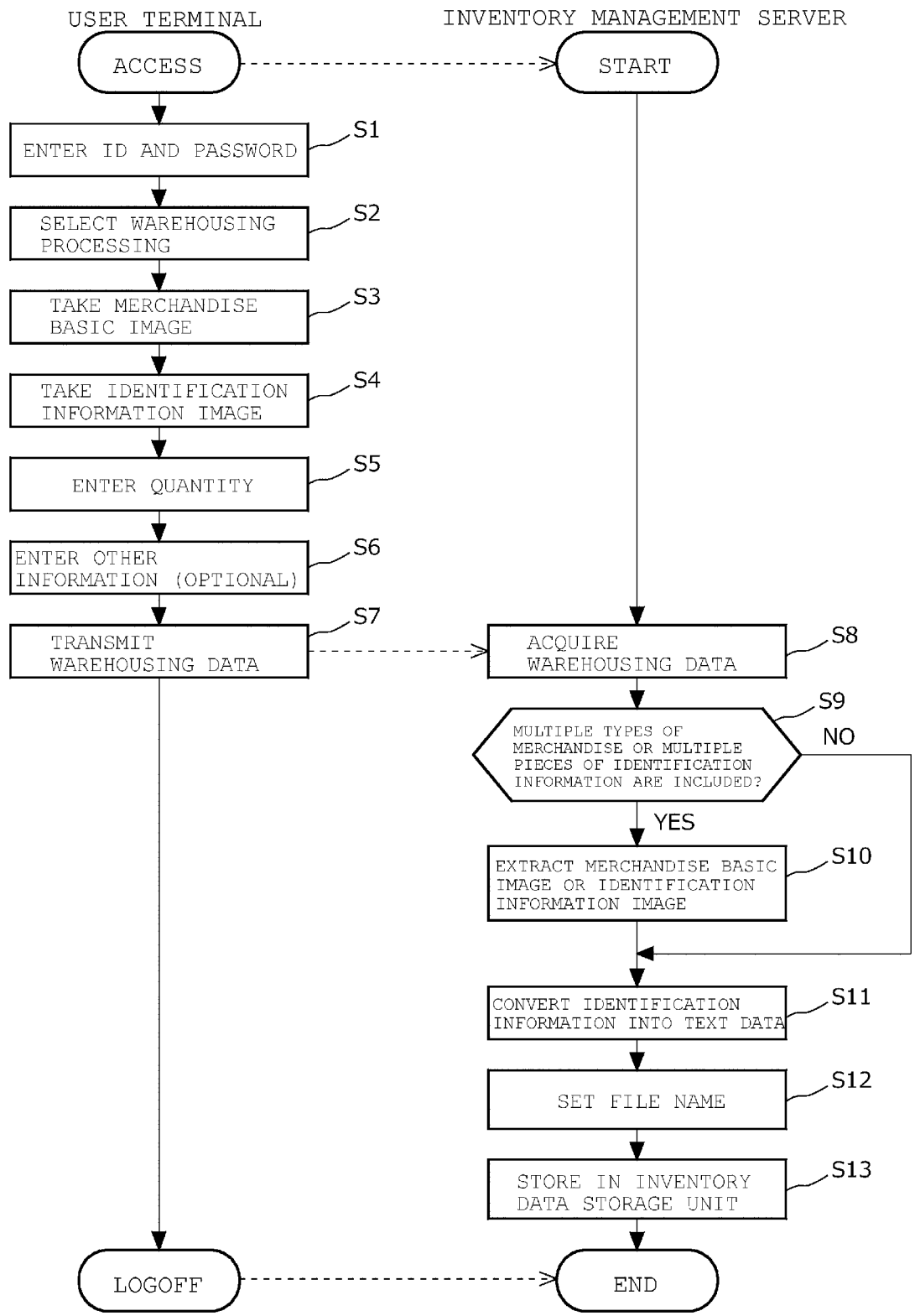
FIG. 12 is a flowchart illustrating warehousing processing in the embodiment.

As shown in FIG. 12, in the case of performing the warehousing processing, the user terminal 2 accesses the inventory management server 4 to display the login screen shown in FIG. 4, and logs in by entering a login ID and a password (S1). By logging in, the user terminal 2 is caused to display, on the display means 22, a main screen on which any of warehousing processing, delivery processing, inventory checking processing, sales processing, and ordering processing can be selected as shown in FIG. 5. By selecting warehousing processing here, the processing proceeds to a warehousing processing screen shown in FIG. 13 (S2).

Figure 13:
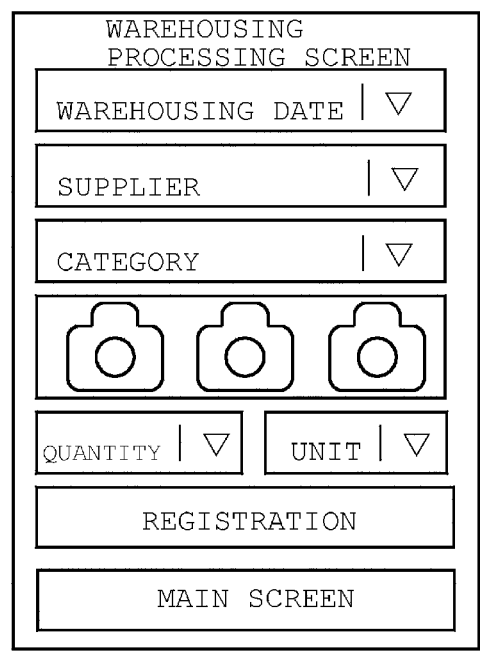
FIG. 13 is a diagram illustrating a warehousing processing screen of the user terminal in the embodiment.

The user terminal 2 photographs merchandise to be warehoused by the photographing means 21 (S3). In the embodiment, as shown in FIG. 13, by touching an icon imitating a shape of a camera on the warehousing processing screen, the photographing means 21 of the user terminal 2 is activated and photographs "potatoes" as merchandise. In addition, when it is desired to perform warehousing processing of multiple types of merchandise at the same time, the photographing means 21 takes a still image or moving image including multiple types of merchandise (for example, "potatoes" and "carrots") as shown in FIG. 10 or 11.

The user terminal 2 photographs identification information on the merchandise (S4). By touching another camera-shaped icon different from the icon used for photographing the merchandise basic image displayed on the warehousing processing screen, the photographing means 21 is activated to photograph. In the embodiment, on a cardboard box in which potatoes, which are the merchandise, are packed, the photographing means 21 photographs a portion on which a production area, variety, and the like are described as a first identification information image with a still image or moving image. Furthermore, by touching a third camera-shaped icon, the photographing means 21 is activated and photographs a portion on which a use-by date of the merchandise is described as a second identification information image with a still image or moving image. At this time, the first identification information image and the second identification information image may be taken as one still image, and the first identification information image and the second identification information image may be taken as one moving image.

Next, the user terminal 2 enters a warehoused quantity of the merchandise using the input means 23 (S5). In the embodiment, the user touches a triangular icon displayed alongside a description of "quantity" on the warehousing processing screen to display a table of figures as shown in FIG. 9, and selects a numerical value for the quantity from it. In addition, the user touches a triangular icon displayed alongside a description of "unit" to display a table of units such as "Kg," "piece," and "box," and selects a unit for the quantity from it. If the user desires to perform warehousing processing of multiple types of merchandise at the same time, the user enters a warehoused quantity for each merchandise type. If a quantity of merchandise included in the merchandise basic image coincides with the warehoused quantity, the input step of the warehoused quantity (S5) may be omitted.

The input of the numerical value and unit concerning the warehoused quantity is not limited to the method of selecting from a table, and may be entered using the keyboard or the like.

Next, the user terminal 2 optionally enters other identification information (S6). In the embodiment, a supplier and a category for making retrieval possible by arbitrarily assigned category are entered. In the embodiment, "potatoes" is selected as a category.

When the input of the warehoused quantity or the like is finished, the user terminal 2 transmits the merchandise basic image, first identification information image, second identification information image, warehoused quantity, warehousing date, supplier, and category as warehousing data to the inventory management server 4 (S7). In the embodiment, transmission processing is performed by touching an area described as "registration" displayed on the warehousing processing screen.

When the inventory management server 4 is accessed from the user terminal 2, the inventory management program 4a stored in the program storage unit 51 is executed by the computation processing means 6.

The display control unit 64 transmits the login screen, main screen, or warehousing processing screen to the user terminal 2 every time the access, login, or selection of warehousing processing from the user terminal 2 is performed, respectively, although it is not shown in the flowchart in FIG. 12.

The warehousing data acquisition unit 61 acquires the warehousing data from the user terminal 2 (S8: warehousing data acquisition step). In the embodiment, it acquires the merchandise basic image, first identification information image, second identification information image, warehoused quantity, warehousing date, supplier, and category.

Next, the warehousing merchandise image extraction unit 70 determines whether or not the merchandise basic image or identification information image includes multiple types of merchandise or multiple pieces of identification information by image analysis (S9). If a merchandise basic image or an identification information image acquired by the warehousing data acquisition unit 61 is a still image, the warehousing merchandise image extraction unit 70 determines whether or not multiple types of merchandise or multiple pieces of identification information are included in the still image. On the other hand, if a merchandise basic image or an identification information image acquired by the warehousing data acquisition unit 61 is a moving image, the warehousing merchandise image extraction unit 70 determines whether or not multiple types of merchandise or multiple pieces of identification information are included in the moving image by making image analysis of an appropriate one of frame images constituting the moving image.

Here, if the merchandise basic image or identification information image includes multiple types of merchandise or multiple pieces of identification information (S9: YES), the warehousing merchandise image extraction unit 70 extracts a merchandise basic image or an identification information image for each merchandise type by image analysis (S10: warehousing merchandise image extraction step). Although the flowchart in FIG. 12 does not show, in the following steps S11-S13, processing of each step is performed for each of the extracted merchandise basic images or for each of the identification information images.

On the other hand, if the merchandise basic image or identification information image does not include multiple types of merchandise or multiple pieces of identification information (S9: NO), the processing proceeds to next step S11. If a quantity of merchandise included in the merchandise basic image coincides with the warehoused quantity and the input of the warehoused quantity is omitted at the user terminal 2, the warehousing merchandise image extraction unit 70 makes image analysis of the merchandise basic image, extracts a quantity for each merchandise type, and acquires the quantity as a warehoused quantity for each product.

Next, the identification information text processing unit 65 converts identification information included in the identification information image into text data by image analysis (S11). In the embodiment, because the use-by date is photographed as identification information in the second identification information image, the use-by data is converted into text data. If the warehousing merchandise image extraction unit 70 extracts multiple identification information images, identification information is converted into text data for each of the extracted identification information images.

The warehousing data acquisition unit 61 sets a number automatically allocated by incrementing a predetermined number for each product as an arbitrary file name as shown in FIG. 14 (S12). In the embodiment, "1001" is allocated, file names of the merchandise basic image, the first identification information image, and the second identification information image are made "1001_1," "1001_2," and "1001_3" respectively and stored in the inventory data storage unit 52 together with other warehousing data (S13: inventory data storage step). In addition, the use-by date converted into text data by the identification information text processing unit 65 and as the slip number, the above-described "1001" which is the file name of the merchandise basic image are also stored in the inventory data storage unit 52. At this time, if the warehousing merchandise image extraction unit 70 extracts a merchandise basic image including multiple types of merchandise, the merchandise basic image is stored in the inventory data storage unit 52 for each of the extracted merchandise types.

The inventory data storage unit 52 stores pieces of data in respective items of the processing division, slip number, date, merchandise basic image, first identification information image, second identification information image, quantity, unit, use-by date, supplier, and category, as shown in FIG. 14.

This leads to completion of the warehousing processing of merchandise to be warehoused. The warehousing processing is performed on a product-by-product basis. For multiple types of merchandise, the warehousing processing is performed continuously for each product or the warehousing processing is performed by taking a merchandise basic image including multiple types of merchandise.

After the end of warehousing processing, the processing proceeds to the main screen, and when logoff is selected, the user terminal 2 is logged off from the inventory management server 4. Along with the logoff, the execution of the inventory management program 4a in the inventory management server 4 is terminated.

(Delivery Processing)

Figure 15:
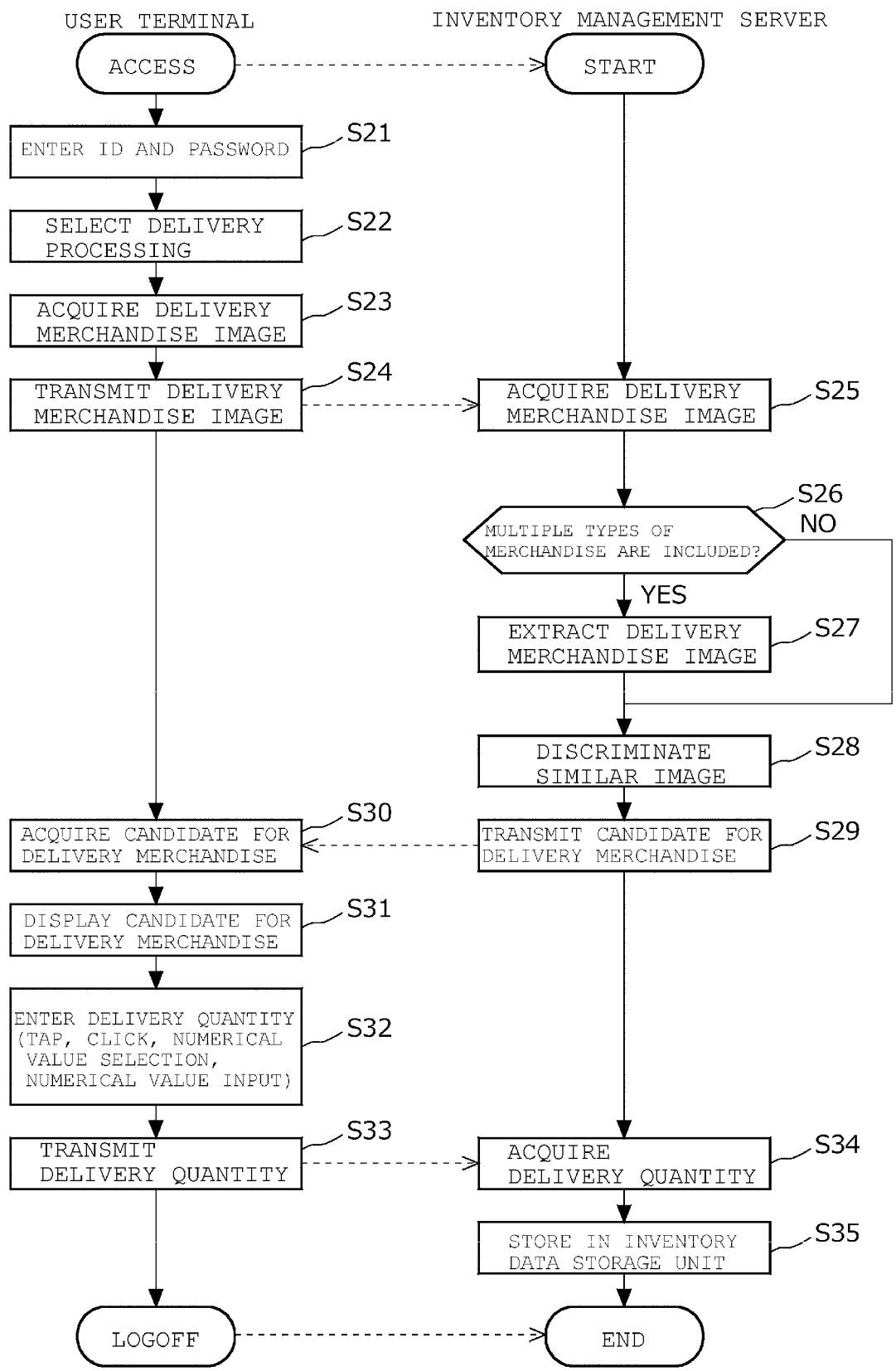
FIG. 15 is a flowchart illustrating delivery processing in the embodiment.
Figure 16:
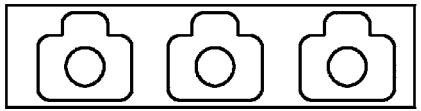
FIG. 16 is a diagram illustrating a delivery processing screen of the user terminal in the embodiment.

Next, the delivery processing will be described. As shown in FIG. 15, in the case of performing the delivery processing, the user terminal 2 accesses the inventory management server 4 and logs in (S21) in the same manner as the warehousing processing. By selecting delivery processing on the main screen, the processing proceeds to a delivery processing screen shown in FIG. 16 (S22).

The user terminal 2 enters information for searching for merchandise of which the delivery processing will be performed. Here, a case of search using the similar image discrimination unit 63 of the inventory management server 4 will be described. The user terminal 2 photographs merchandise to be delivered or merchandise similar to the merchandise to be delivered with a still image or moving image and acquires it as a delivery merchandise image (S23). In the embodiment, by touching an icon imitating a shape of a camera on the delivery processing screen, the photographing means 21 of the user terminal 2 is activated and photographs merchandise to be delivered, "potatoes" in the embodiment. When the user desires to perform delivery processing of multiple types of merchandise at the same time, a still image or moving image including multiple types of merchandise (for example, "potatoes" and "carrots") is taken as shown in FIG. 10 or 11.

The potatoes to be photographed at this time should be able to identify warehoused merchandise in the inventory management server 4. For example, it is not necessary to limit the potatoes to merchandise to be actually delivered, and other potatoes not to be delivered may substitute. In addition, the delivery merchandise image is not limited to the taken image and may be a still image, moving image, or the like retrieved on the Internet.

The user terminal 2 then transmits the acquired delivery merchandise image to the inventory management server 4 (S24). In the embodiment, by selecting registration on the delivery processing screen after taking the delivery merchandise image, the delivery merchandise image is transmitted to the inventory management server 4.

When the inventory management server 4 is accessed from the user terminal 2, the inventory management program 4a stored in the program storage unit 51 is executed by the computation processing means 6 in the same manner as the warehousing processing.

The delivery merchandise image acquisition unit 62 acquires the delivery merchandise image transmitted by the user terminal 2 (S25: delivery merchandise image acquisition step).

Next, the delivery merchandise image extraction unit 71 determines whether the delivery merchandise image includes multiple types of merchandise by image analysis (S26). If a delivery merchandise image acquired by the delivery merchandise image acquisition unit 62 is a still image, the delivery merchandise image extraction unit 71 determines whether multiple types of merchandise are included in the still image. On the other hand, if a delivery merchandise image acquired by the delivery merchandise image acquisition unit 62 is a moving image, the delivery merchandise image extraction unit 71 determines whether multiple types of merchandise are included in the moving image by making image analysis of each frame image.

Here, if the delivery merchandise image includes multiple types of merchandise or multiple pieces of identification information (S26: YES), the delivery merchandise image extraction unit 71 extracts a delivery merchandise image for each merchandise type by image analysis (S27: delivery merchandise image extraction step). Although the flowchart in FIG. 15 does not show, in the following steps S28-S35, processing of each step is performed for each of extracted delivery merchandise images. It is not shown, but if a quantity of merchandise included in the delivery merchandise image coincides with a delivery quantity, the delivery merchandise image extraction unit 71 may make image analysis of the delivery merchandise image, extracts a quantity for each merchandise type, and acquire the quantity as a delivery quantity for each product.

The similar image discrimination unit 63 compares the delivery merchandise image with the merchandise basic image stored in the inventory data storage unit 52 and determines whether the images are similar to each other (S28: similar image determination step). Because the delivery merchandise image is an image of merchandise to be delivered or merchandise similar to the merchandise to be delivered, inventory data corresponding to the merchandise basic image determined to be similar to the delivery merchandise image has a high possibility of inventory data of the merchandise to be delivered.

Therefore, the display control unit 64 transmits the inventory data corresponding to the merchandise basic image determined to be similar to the delivery merchandise image to the user terminal 2 in order to have it displayed as a candidate for the delivery merchandise (S29). At this time, the display control unit 64 transmits the inventory data corresponding to the merchandise basic image for each extracted merchandise type if a delivery merchandise image including multiple types of merchandise is extracted by the delivery merchandise image extraction unit 71.

The user terminal 2 acquires the inventory data on the candidate for delivery merchandise (S30), displays it together with the merchandise basic image or identification information image on the display means 22 (S31). If there are a plurality of candidates for delivery merchandise, they are displayed so that their inventory data can be viewed as a list as shown in FIG. 6 or 7. At this time, the merchandise basic image and the identification information image are displayed with the warehousing date and the quantity of the merchandise overlaid thereon.

Figure 17:
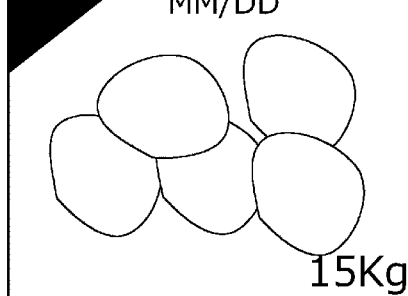
FIG. 17 is a diagram illustrating a delivery quantity input screen of the user terminal in the embodiment.

The user terminal 2 selects merchandise of which the delivery processing will be performed from the candidates for delivery merchandise displayed on the display means 22. In the embodiment, it is selected by long-pressing a merchandise basic image or identification information image displayed on the display means 22. Then, the selected merchandise basic image or identification information image of inventory data is enlarged so that only the corresponding inventory data is displayed as shown in FIG. 17. At this time, swiping the displayed image can switch to another image as shown in FIG. 8, and the merchandise can be confirmed by the identification information image or the like.

Next, the user terminal 2 enters a delivery quantity of the delivery merchandise (S32). In the embodiment, a numerical value for the quantity of the merchandise is decremented according to the number of taps of the displayed merchandise basic image or identification information image. The decremented quantity of the merchandise is displayed by overlaying it on the merchandise basic image or identification information image.

When input of the delivery quantity is finished, the user terminal 2 transmits the delivery quantity to the inventory management server 4 (S33). In the embodiment, transmission processing is performed by touching an area described as "registration" displayed on a delivery quantity input screen in the same manner as the time of transmitting the warehousing data in the warehousing processing.

The inventory management server 4 acquires the delivery quantity transmitted by the user terminal 2 (S34). If a quantity of merchandise included in the delivery merchandise image coincides with the delivery quantity and the delivery merchandise image extraction unit 71 has made image analysis of the delivery merchandise image and acquired a delivery quantity for each merchandise type, steps (S32-34) of entering the delivery quantity by the user terminal 2 and acquiring the delivery quantity by the inventory management server 4 can be omitted.

The quantity management unit 66 acquires the number of taps as the delivery quantity, and causes the inventory data storage unit 52 to store the delivery quantity and a delivery date as delivery data in association with the merchandise basic image (S35).

As shown in FIG. 18, the inventory data storage unit 52 stores the delivery data so that it is aligned with the warehousing data correspondingly to the slip number stored as the file name of the merchandise basic image. In addition, if the delivery processing is performed multiple times for the same merchandise, the delivery data is suitably stored so that it is continuous to previous delivery data. By storing the warehousing data and the delivery data individually in this manner, it is possible to recount the inventory quantity at any time from the warehoused quantity and the delivery quantity.

After the end of delivery processing, the processing proceeds to the main screen, and when logoff is selected, the user terminal 2 is logged off from the inventory management server 4, and the execution of the inventory management program 4*a* in the inventory management server 4 is terminated.

(Inventory Checking Processing)

Figure 19:
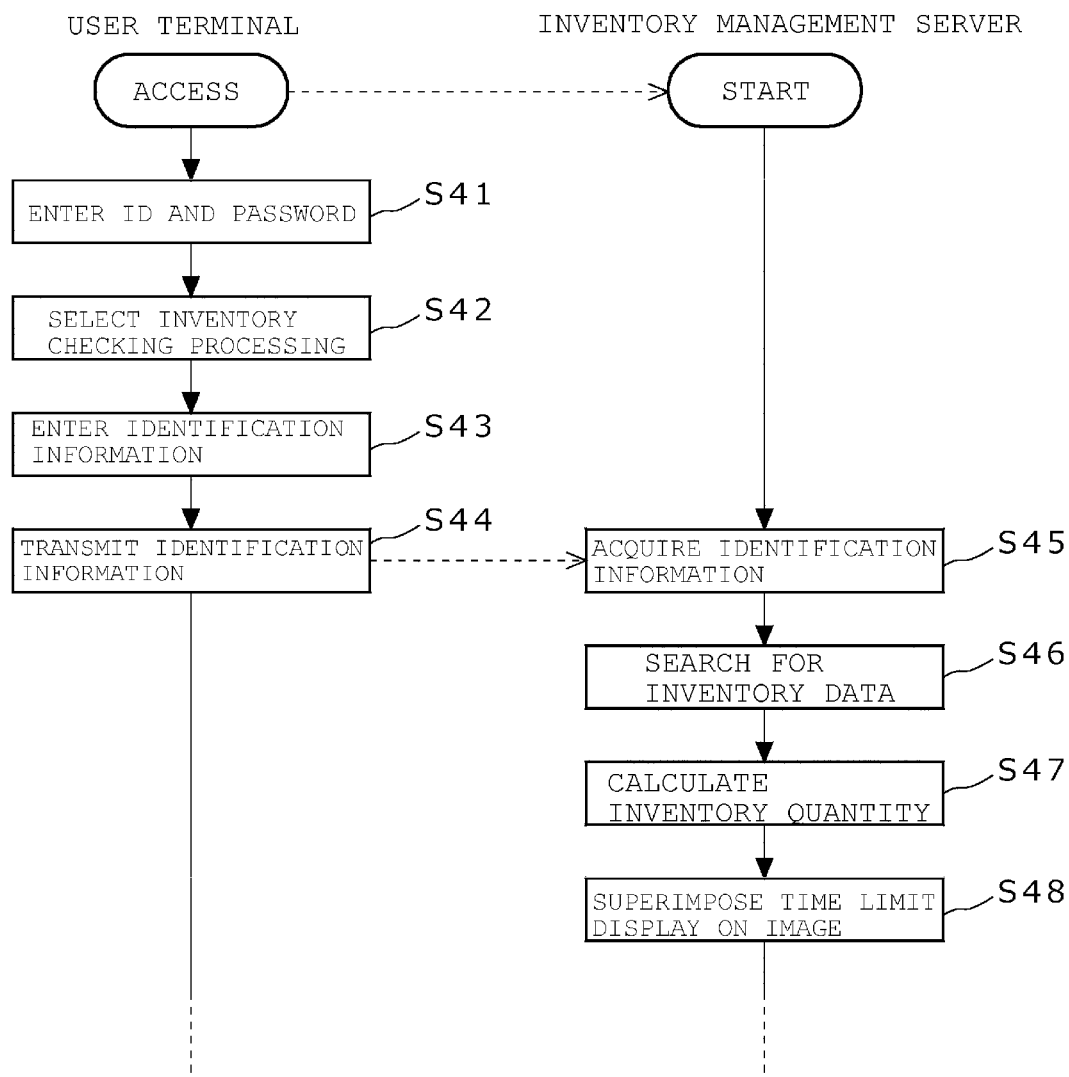
FIG. 19 is a flowchart illustrating from processing start to retrieving inventory data of inventory checking processing in the embodiment.

Next, the inventory checking processing will be described. The inventory checking processing is processing to mainly cause the user terminal 2 to display relevant inventory data so that the inventory quantity, use-by date, and the like of merchandise can be checked in order to determine order to deliver the merchandise and necessity of ordering processing. As shown in FIG. 19, in the case of performing the inventory checking processing, the user terminal 2 accesses the inventory management server 4 and logs in (S41) in the same manner as the warehousing processing and the delivery processing. Then, by selecting inventory checking processing on the main screen, the processing proceeds to an inventory checking processing screen shown in FIG. 21 (S42).

Figure 21:
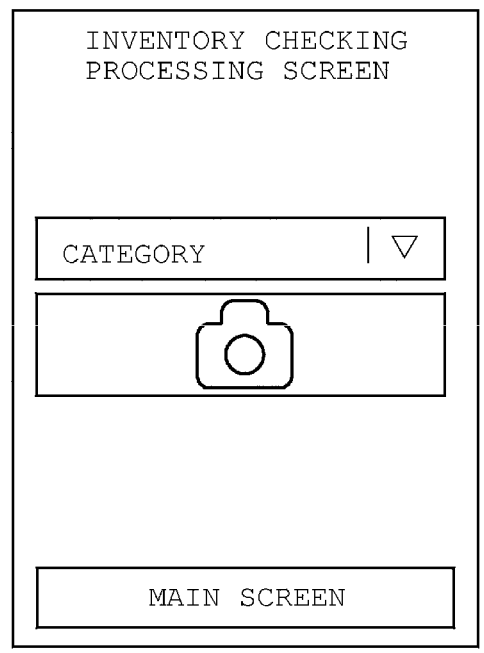
FIG. 21 is a diagram illustrating an inventory checking processing screen of the user terminal in the embodiment.

The user terminal 2 enters information for searching for merchandise of which the inventory checking processing will be performed (S43). Here, a case of inputting a category as identification information will be described. As shown in FIG. 21, by touching a triangular icon displayed alongside a description of "category" on the inventory checking processing screen, a table of selectable categories is displayed. In the embodiment, "potatoes" in the categories should be selected.

The above-described identification information may be a delivery merchandise image composed of a still image or moving image in the same manner as the delivery processing and may be other identification information such as the supplier or warehousing date.

The user terminal 2 transmits the entered identification information to the inventory management server 4 (S44). In the embodiment, by selecting registration on the inventory checking processing screen, the identification information is transmitted to the inventory management server 4.

The inventory management server 4 acquires the identification information on merchandise (S45) and searches the inventory data for inventory data corresponding to the identification information (S46). If the identification information is a delivery merchandise image, the inventory data may be searched for by comparison between the delivery merchandise image and the merchandise basic image in the same manner as the delivery processing. In addition, if the delivery merchandise image includes multiple types of merchandise, the inventory management server 4 may extract a delivery merchandise image for each merchandise type from the delivery merchandise image by image analysis, compare it with the merchandise basic image for each delivery merchandise image, and search for the inventory data.

The quantity management unit 66 calculates an inventory quantity of the retrieved inventory data (S47). Specifically, as shown in FIG. 18, it is calculated by subtracting the delivery quantity stored in the delivery processing from the warehoused quantity stored in the warehousing processing in the inventory data stored in the inventory data storage unit 52.

The time limit management unit 67 determines whether a time limit of the retrieved inventory data is close to a set predetermined time limit, and if it is within the predetermined time limit, superimposes a display of such notice on the merchandise basic image and the identification information image (S48). In the embodiment, when an inventory checking processing date is 8 days or more before the use-by date of the merchandise, processing is not performed on the merchandise basic image and the identification information image.

On the other hand, when the processing date is within a period from the day of the use-by date to 7 days before it, a display of a yellow triangle is superimposed on the upper left corner of the merchandise basic image or identification information image. In addition, if the processing date has passed the use-by date, a display of a red triangle is superimposed on the upper left corner of the merchandise basic image or identification information image. In this way, in the embodiment, not only the inventory quantity is checked, but also the time limit management of the use-by date or the like can be carried out.

Figure 20:
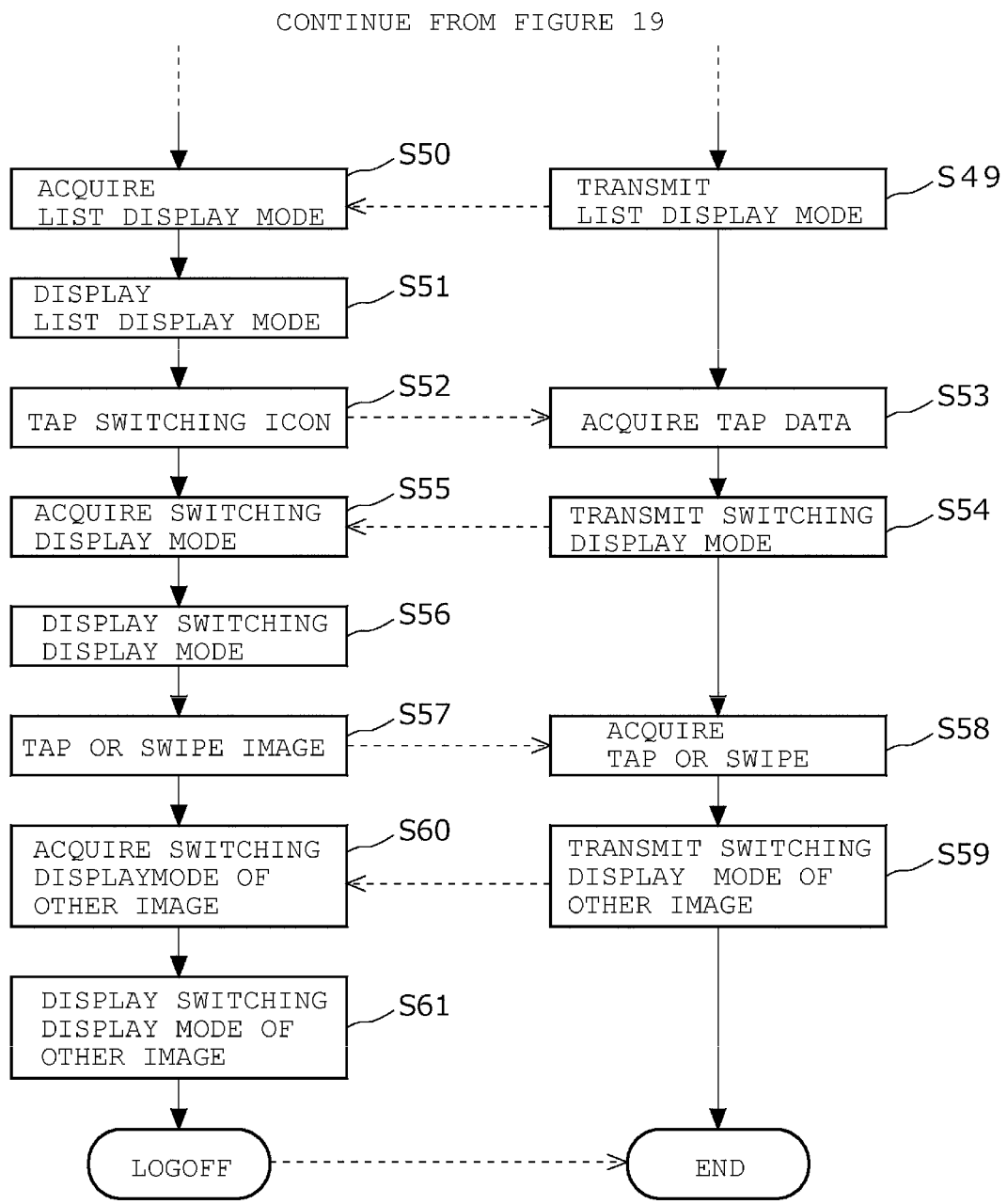
FIG. 20 is a flowchart illustrating from display of the retrieved inventory data to processing end of the inventory checking processing in the embodiment.

Next, a display example on the user terminal 2 in the inventory checking processing in the embodiment will be described. In the embodiment, as shown in FIG. 20, the list display mode is transmitted to the user terminal 2 as an initial display of the inventory data (S49). A display mode initially displayed can be arbitrarily set.

The user terminal 2 acquires the inventory data as the list display mode (S50) and displays it on the display means 22 (S51). Specifically, the inventory quantity and warehousing date calculated by the quantity management unit 66 are displayed alongside the merchandise basic image and the identification information image as shown in FIG. 6. In the list display mode, because the merchandise basic image of equivalent merchandise, "potatoes" in the embodiment, is displayed together with the identification information image, difference between each product is obvious.

When switching from the list display mode to the switching display mode, an icon imitating the switching display mode displayed alongside a description of the category "potatoes" is tapped as shown in FIG. 6 (S52).

The inventory management server 4 acquires data indicating the icon was tapped (S53). Then, the display control unit 64 transmits the switching display mode to the user terminal 2 (S54).

The user terminal 2 acquires the switching display mode (S55) and displays it on the display means 22 (S56). Specifically, either the merchandise basic image or identification information image is displayed as shown in FIG. 7. The inventory quantity and the warehousing date are displayed by being overlaid on the displayed image. At this time, since the images are displayed larger than the list display mode, each image becomes easy to see. On the other hand, other images cannot be seen. Therefore, in the switching display mode, the image displayed on the user terminal 2 is tapped or swiped as shown in FIG. 8 (S57).

The inventory management server 4 acquires data indicating that the image was tapped or swiped (S58). The display control unit 64 transmits the switching display mode in which an image has been switched to another image to the user terminal 2 every time the image is tapped or swiped (S59).

The user terminal 2 acquires the switching display mode in which the image has been switched to the other image (S60), and displays it on the display means 22 (S61). As a result, the image is switched appropriately, and the other image can be easily checked.

When switching from the switching display mode to the list display mode, an icon imitating the switching display mode displayed alongside a description of the category "potatoes" is tapped as shown in FIG. 7. As a result, the inventory management server 4 acquires data indicating that the icon was tapped, and transmits the list display mode to the user terminal 2 by the display control unit 64 although it is not shown.

In this way, for display of the merchandise basic image and the identification information image, it is possible to arbitrarily select the list display mode or switching display mode so that they can be checked easily.

After the end of inventory checking processing, the processing proceeds to the main screen, and when logoff is selected, the user terminal 2 is logged off from the inventory management server 4, and the execution of the inventory management program 4a in the inventory management server 4 is terminated.

(Sales Processing)

Figure 22:
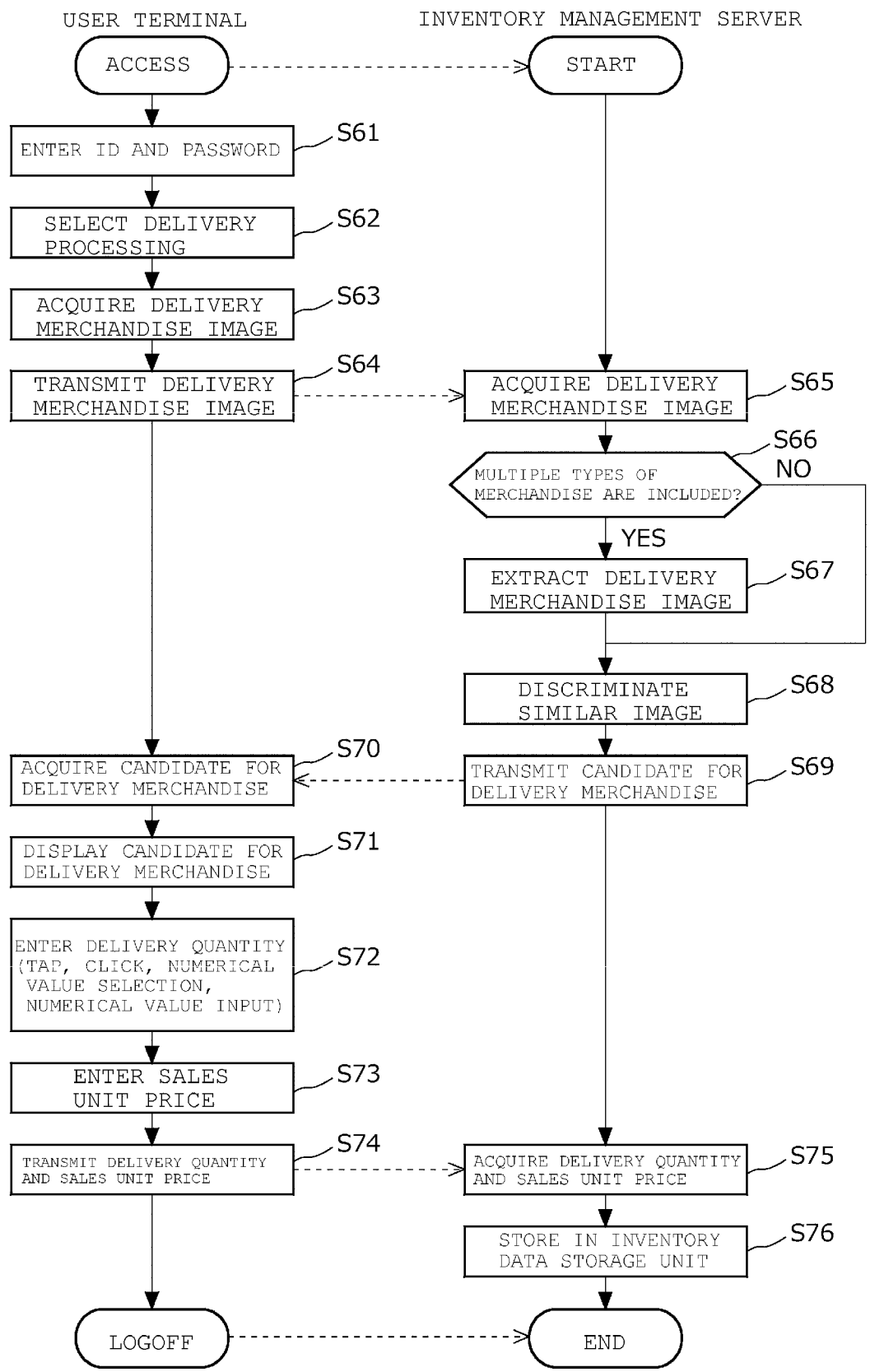
FIG. 22 is a flowchart illustrating sales processing in the embodiment.

Next, the sales processing will be described. As shown in FIG. 22, the sales processing is the same as the delivery processing except that sales processing is selected from access to entering the delivery quantity (S61-S72). That is, in the same manner as S21-S32 in FIG. 15, the user terminal 2 takes a still image or moving image of the delivery merchandise image and transmits the delivery merchandise image to the inventory management server 4; thereby single or multiple candidates for delivery merchandise included in the delivery merchandise image are transmitted to the user terminal 2 and a delivery quantity is acquired by entering a delivery quantity for each of the candidates for delivery merchandise or making image analysis of the delivery merchandise image.

Next, in the case of the sales processing, a sales unit price is entered (S73) after the delivery quantity is entered at the user terminal 2. When the inventory management server 4 acquires the delivery quantity by making image analysis of the delivery merchandise image, it is not necessary for the user terminal 2 to transmit the delivery quantity. In addition, when the sales management unit 68 acquires a sales unit price corresponding to the delivery merchandise from the unit price storage unit 54, transmission of the sales unit price is not necessary either.

In the embodiment, the user terminal 2 transmits the sales unit price together with the delivery quantity to the inventory management server 4 (S74). In the case where delivery merchandise image extraction unit 71 of the inventory management server 4 acquires the delivery quantity by image analysis of the delivery merchandise image and the sales management unit 68 acquires the sales unit price corresponding to the delivery merchandise from the unit price storage unit 54, the user terminal 2 transmits data indicating the displayed candidate for the delivery merchandise, and approval of its delivery quantity and sales unit price, or a delivery quantity and a sales unit price entered and modified appropriately.

In the inventory management server 4, the sales management unit 68 acquires the delivery quantity and the sales unit price transmitted by the user terminal 2 (S75). Then, it stores the acquired delivery quantity and sales unit price in the inventory data storage unit 52 in association with the merchandise basic image (S76).

In this way, it is possible to manage merchandise sold and sales thereof almost in the same manner as the delivery merchandise. Along with the delivery quantity, it is possible to manage the sales unit price and use the user terminal 2 as a POS register or the like. In the case where a delivery quantity is acquired by image analysis, it is possible to omit the input of the delivery quantity by the user terminal 2, and if the sales unit price corresponding to the delivery merchandise is stored in advance in the unit price storage unit 54, it becomes possible to perform the sales processing by only transmitting the delivery merchandise image from the user terminal 2 and approving an acquired candidate for the delivery merchandise.

(Ordering Processing)

Next, the ordering processing will be described. This ordering processing is mainly that a user orders merchandise using the user terminal 2, and another user confirms order data using the order acceptor terminal 3 and ships the merchandise as shown in FIG. 1.

Figure 23:
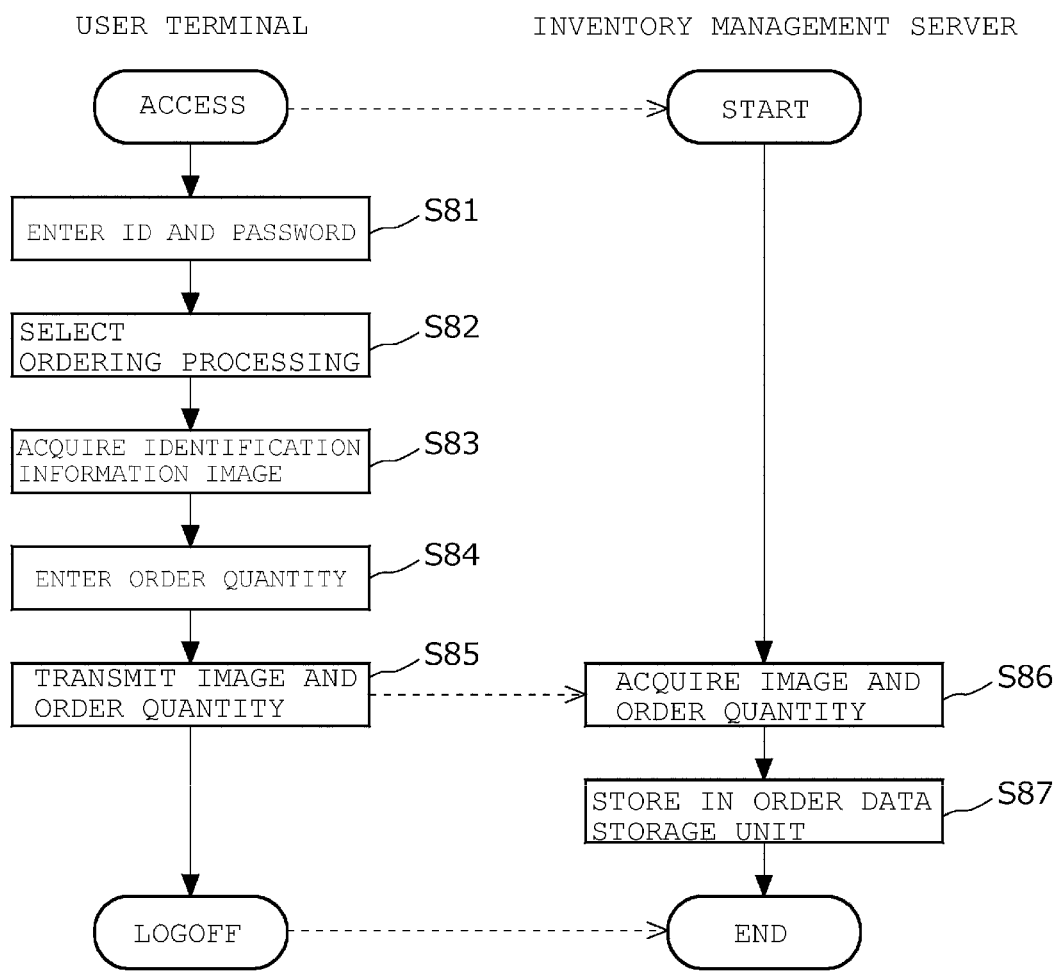
FIG. 23 is a flowchart illustrating ordering processing in the embodiment.

When performing the ordering processing, as shown in FIG. 23, the user terminal 2 accesses the inventory server and logs in (S81). Then, it selects ordering processing on the main screen (82).

Next, the user terminal 2 acquires an identification information image of delivery merchandise (S83). In the embodiment, the photographing means 21 photographs and acquires identification information on the delivery merchandise. The identification information image may be any of a still image and moving image in the same manner as the warehousing processing and the like. In addition, the identification information image may include multiple pieces of identification information. Furthermore, acquisition of the identification information image is not limited to using the photographing means 21 and may be acquired from an identification information image of inventory data transmitted by the inventory management server 4.

Next, the user terminal 2 enters an order quantity (S84). An input method of the order quantity may be based on a number of taps or a number of clicks, or may be an input method of using a table or an input method of a numerical value using the keyboard or the like in the same manner as entering the delivery quantity. Alternatively, it may be a method of transmitting a merchandise basic image obtained by photographing a number of products coinciding with the order quantity and having the order quantity acquired by image analysis at the inventory management server 4. In the embodiment, the user terminal 2 transmits the identification information image and the entered order quantity to the inventory management server 4 (S85).

In the inventory management server 4, the ordering management unit 69 acquires the identification information image, order quantity, and order unit price (S86). Here, the order unit price is acquired from the unit price storage unit 54 by the ordering management unit 69. In addition, if the identification information image acquired by the ordering management unit 69 includes multiple pieces of identification information, the warehousing merchandise image extraction unit 70 may extract an identification information image for each piece of identification information included in the identification information image. The inventory management server 4 then causes the order data storage unit 53 to store the acquired order quantity and order unit price as order data in association with the identification information image (S87).

The order acceptor terminal 3 accesses the inventory management server 4 and checks order data as shown in FIG. 1. If there is order data, merchandise for an ordered quantity is shipped on the basis of the order data. At this time, since the order data includes the identification information image, the production area, variety, size, and the like of the merchandise can be checked without checking detailed data on identification information.

The order acceptor terminal 3 also can check warehousing data by accessing the inventory management server 4 after shipment and check whether the shipped merchandise is warehoused. As a result, it is possible to quickly cope in case warehousing of merchandise is delayed due to a problem during transportation of the merchandise.

According to the above-described embodiment, following effects can be obtained.

1. A merchandise master is unnecessary, and costs for constructing and managing a system can be reduced.
2. Inventory management can be simply and easily carried out by intuitive operations such as taking an image of merchandise and tapping or swiping the image with a smart phone, tablet PC, or the like without requiring troublesome PC operation.
3. Labor required for an input operation can be drastically reduced because merchandise and identification information, such as a production area, variety, size, and the like thereof, are managed mainly as images.
4. It is possible to easily search for inventory data without remembering an inventory number or the like necessary for the search because merchandise to undergo each processing can be found by image search.
5. Data requiring management as text data such as a use-by date can be converted into text data by making image analysis of identification information included in an identification information image.
6. By superimposing and displaying time limit information such as the use-by date on the image, it is possible to intuitively judge from which merchandise to use for the same type of merchandise without accessing the time limit information, for example.
7. It is possible to prevent or reduce, for example, mistakes in merchandise involved in each processing since sales processing and ordering processing are performed using images.
8. It is possible to perform warehousing processing or delivery processing for multiple types of merchandise or multiple pieces of identification information during one work by using an image including multiple types of merchandise or an image including multiple pieces of identification information The inventory management server, the inventory management system, the inventory management program, and the inventory management method according to the invention are not limited to the above-described embodiment and can be changed as appropriate. For example, inventory management for foods has been described, but merchandise that can be inventoried is not limited to foods and they are applicable to other merchandise that requires inventory management like machine parts and the like.

REFERENCE SIGNS LIST

1 Inventory management system
2 User terminal

3 Order acceptor terminal
4 Inventory management server
4a Inventory management program
5 Storage means
6 Computation processing means
21 Photographing means
22 Display means
23 Input means
51 Program storage unit
52 Inventory data storage unit
53 Order data storage unit
54 Unit price storage unit
61 Warehousing data acquisition unit
62 Delivery merchandise image acquisition unit
63 Similar image discrimination unit
64 Display control unit
65 Identification information text processing unit
66 Quantity management unit
67 Time limit management unit
68 Sales management unit
69 Ordering management unit
70 Warehousing merchandise image extraction unit
71 Delivery merchandise image extraction unit

The invention claimed is:

1. An inventory management system for carrying out inventory management by using images of merchandise, comprising:
 a network;
 an inventory management server being connected to the network;
 a user terminal being connected to the inventory management server via the network, the user terminal including a photographing device and a display device, wherein
 the photographing device of the user terminal is configured to capture, at the time of registering a merchandise to the inventory:
  a merchandise basic image of a merchandise, and
  an identification information image that shows identifying information of the merchandise,
 the photographing device of the user terminal is configured to capture, at the time of requesting delivery of a delivery merchandise:
  a delivery merchandise image of the delivery merchandise,
 the display device of the user terminal is configured to display the merchandise basic image, the identification information image and the delivery merchandise image and to function as an input device,
 the inventory management server includes a processor and a storage device storing a program, and when the program is executed, the processor is caused to function as:
  a registration data acquisition unit which acquires, at the time of registering the merchandise, registration data of the merchandise from the user terminal;
  a delivery merchandise image acquisition unit which acquires, from the user terminal, the delivery merchandise image of the delivery merchandise or a merchandise similar to the delivery merchandise;
  a similar image discrimination unit which compares, for delivery of the merchandise, the acquired delivery merchandise image of the delivery merchandise with the merchandise basic image of merchandise stored in the storage device and determines a merchandise basic image of a merchandise similar to the delivery merchandise image; and
  a display control unit which causes the user terminal to display the determined merchandise basic image as a candidate delivery merchandise on the display device, and
 the storage device functions as an inventory data storage unit which stores the warehousing data of the merchandise and a delivery quantity of the delivery merchandise as inventory data, the inventory data corresponding to the merchandise basic image determined to be similar to the delivery merchandise image,
 at the time of registering the merchandise,
  the user terminal captures the merchandise basic image of the merchandise and the identification information image of the merchandise by using the photographing device and receives input of a registration quantity of the merchandise and a registration date of the merchandise by using the display device,
  the user terminal transmits, as the registration data of the merchandise, the merchandise basic image of the merchandise, the identification information image of the merchandise, the registration quantity of the merchandise and the registration date of the merchandise to the inventory management server, and
  upon receipt of the registration data of the merchandise from the user terminal by the registration data acquisition unit, the processor of the inventory management server causes the storage device to store the received registration data of the merchandise in the inventory data, and
 at the time of requesting the delivery of a delivery merchandise,
  the user terminal captures the delivery merchandise image of the delivery merchandise by using the photographing device,
  the user terminal transmits the delivery merchandise image to the inventory management server,
  upon receipt of the delivery merchandise image from the user terminal by the delivery merchandise image acquisition unit, the processor of the inventory management server causes the similar image discrimination unit to perform the comparison and determination of the merchandise basic image of the candidate delivery merchandise similar to the delivery merchandise image,
  upon completion of the comparison and the determination of the merchandise basic image by the similar image discrimination unit, the display control unit transmits the determined merchandise basic image of the candidate delivery merchandise to the user terminal to be displayed thereon,
  the user terminal receives an input of a delivery quantity of the candidate delivery merchandise by using the display device and transmits the delivery quantity of the candidate delivery merchandise to the inventory management server,
  upon receipt of the delivery quantity of the candidate delivery merchandise from the user terminal, the processor of the inventory management server causes the storage device to store the received delivery quantity of the candidate delivery merchandise in the inventory data, and
  the inventory management server performs a delivery process of the delivery merchandise based on the delivery quantity of the candidate delivery merchandise;
 the display control unit has a list display mode to cause the user terminal to display a list of all of the merchandise basic image and the identification information image and a switching display mode to cause the user terminal to display either the merchandise basic image or identification information image and switch the displayed image to another image every time the displayed image is tapped or swiped;

wherein the processor of the inventory management server is caused to also function as:

a time limit management unit which, when the merchandise basic image or the identification information image is transmitted to the user terminal, if a predetermined time limit set to corresponding merchandise has reached a predetermined threshold, causes the user terminal to superimpose and display such notice as a particular shape and color on top of and covering at least one of the merchandise basic image or the identification information image.

2. The inventory management system according to claim 1, wherein the processor of the inventory management system is caused to also function as:

an identification information text processing unit which converts the identification information included in the identification information image into text data by image analysis and causes the inventory data storage unit to store the identification information as the inventory data in association with the merchandise basic image.

3. An inventory management system for carrying out inventory management by using images of merchandise, comprising:

a network;

an inventory management server being connected to the network;

a user terminal being connected to the inventory management server via the network, the user terminal including a photographing device and a display device, wherein the photographing device of the user terminal is configured to capture, at the time of registering a merchandise to the inventory:

a merchandise basic image of a merchandise, and an identification information image that shows identifying information of the merchandise, the photographing device of the user terminal is configured to capture, at the time of requesting delivery of a delivery merchandise:

a delivery merchandise image of the delivery merchandise, the display device of the user terminal is configured to display the merchandise basic image, the identification information image and the delivery merchandise image and to function as an input device, the inventory management server includes a processor and a storage device storing a program, the storage device functions as an inventory data storage unit which stores registration data of merchandises and a delivery quantity of merchandises as inventory data, and when the program is executed, the processor is caused to function as:

a registration data acquisition unit which acquires, at the time of registering the merchandise, the registration data for the merchandise from the user terminal;

a display control unit which causes the inventory data in the inventory data storage unit to be transmitted to the user terminal and causes the display device of the user terminal to display the inventory data in the inventory data storage unit as a candidate delivery merchandise, an input section for receiving an input of a delivery quantity of the delivery merchandise from the user terminal; and a quantity management unit which acquires, as the delivery quantity, a number of taps or a number of clicks of the merchandise basic image or identification information image displayed on the user terminal and causes the inventory data storage unit to store the delivery quantity of the delivery merchandise as the inventory data in association with the merchandise basic image, at the time of registering the merchandise, the user terminal captures the merchandise basic image of the merchandise and the identification information image of the merchandise by using the photographing device and receives input of a quantity of the merchandise and a registration date of the merchandise by using the display device, the user terminal transmits, as the registration data of the merchandise, the merchandise basic image of the merchandise, the identification information image of the merchandise, a registration quantity of the merchandise and a registration date of the merchandise to the inventory management server, and upon receipt of the registration data of the merchandise from the user terminal by the registration data acquisition unit, the processor of the inventory management server causes the storage device to store the received registration data of the merchandise in the inventory data, and at the time of requesting the delivery of a delivery merchandise, the user terminal captures the delivery merchandise image of the delivery merchandise by using the photographing device and transmits the delivery merchandise image to the inventory management server, upon receipt of the delivery merchandise image from the user terminal, the processor of the inventory management server determines the merchandise basic image of the candidate delivery merchandise based on the delivery merchandise image, upon the determination of the merchandise basic image of the candidate delivery merchandise, the display control unit transmits the determined merchandise basic image of the candidate delivery merchandise to the user terminal to be displayed thereon, upon receipt of the determined merchandise basic image of the candidate delivery merchandise from the inventory management server, the user terminal receives an input of the delivery quantity of the candidate delivery merchandise by receiving the number of taps or the number of clicks on the merchandise basic image of the candidate delivery merchandise displayed on the display device of the user terminal and transmits the delivery quantity of the candidate delivery merchandise to the inventory management server, upon receipt of the delivery quantity of the candidate delivery merchandise from the user terminal, the processor of the inventory management server causes the quantity management unit to store the received delivery quantity in the inventory data in the storage device, and the inventory management server processes a delivery of the candidate delivery merchandise to a customer based on the stored deliver quantity;

the display control unit has a list display mode to cause the user terminal to display a list of all of the merchandise basic image and the identification information image and a switching display mode to cause the user terminal to display either the merchandise basic image or identification information image and switch the displayed image to another image every time the displayed image is tapped or swiped;

wherein the processor of the inventory management server is caused to also function as:

a time limit management unit which, when the merchandise basic image or the identification information image is transmitted to the user terminal, if a predetermined time limit set to corresponding merchandise has reached a predetermined threshold, causes the user terminal to superimpose and display such notice as a particular shape and color on top of and covering at least one of the merchandise basic image or the identification information image.

4. An inventory management system for carrying out inventory management by using images of merchandise, comprising:

a network;

an inventory management server being connected to the network;

a user terminal being connected to the inventory management server via the network, the user terminal including a photographing device and a display device, wherein the photographing device of the user terminal is configured to capture, at the time of registering a merchandise to the inventory:

a merchandise basic image of a merchandise, and an identification information image that shows identifying information of the merchandise, the photographing device of the user terminal is configured to capture, at the time of requesting delivery of a delivery merchandise:

a delivery merchandise image of a delivery merchandise, the display device of the user terminal is configured to display the merchandise basic image, the identification information image and the delivery merchandise image and to function as an input device, the inventory management server includes a processor and a storage device storing a program, the storage device functions as an inventory data storage unit which stores registration data of merchandises and a delivery quantity of delivery merchandises as inventory data, and when the program is executed, the processor is caused to function as:

a registration data acquisition unit which acquires, at the time of registering the merchandise, the registration data for the merchandise from the user terminal;

a display control unit which causes the user terminal to display the inventory data in the inventory data storage unit as a candidate delivery merchandise; and a sales management unit which acquires the delivery quantity of a delivery merchandise and a sales unit price of the delivery merchandise displayed on the user terminal from the user terminal and causes the inventory data storage unit to store the delivery quantity and the sales unit price in association with the merchandise basic image corresponding to the delivery merchandise, at the time of registering the merchandise, the user terminal captures the merchandise basic image of the merchandise and the identification information image of the merchandise by using the photographing device and receives input of a quantity of the merchandise and a registration date of the merchandise by using the display device, the user terminal transmits, as the registration data of the merchandise, the merchandise basic image of the merchandise, the identification information image of the merchandise, a registration quantity of the merchandise and a registration date of the merchandise to the inventory management server, and upon receipt of the registration data from the user terminal by the registration data acquisition unit, the processor of the inventory management server causes the storage device to store the received registration data in the inventory data, and at the time of requesting the delivery of a delivery merchandise, the user terminal captures the delivery merchandise image of the delivery merchandise by using the photographing device and transmits the delivery merchandise image to the inventory management server, upon receipt of the delivery merchandise image from the user terminal, the processor of the inventory management server determines the merchandise basic image of the candidate delivery merchandise based on the delivery merchandise image, upon the determination of the merchandise basic image of the candidate delivery merchandise, the display control unit transmits the determined merchandise basic image of the candidate delivery merchandise to the user terminal to be displayed thereon, upon receipt of the determined merchandise basic image of the candidate delivery merchandise from the inventory management server, the user terminal receives an input of the delivery quantity and the sales unit price of the candidate delivery merchandise and transmits the delivery quantity and the sales unit price of the candidate delivery merchandise to the inventory management server, upon receipt of the delivery quantity and the sales price unit of the candidate delivery merchandise from the user terminal, the processor of the inventory management server causes the storage device to store the received delivery quantity and sales unit price of the candidate delivery merchandise in the inventory data, and the inventory management server processes a delivery of the candidate delivery merchandise to a customer based on the stored deliver quantity and sales unit price of the candidate delivery merchandise;

the display control unit has a list display mode to cause the user terminal to display a list of all of the merchandise basic image and the identification information image and a switching display mode to cause the user terminal to display either the merchandise basic image or identification information image and switch the displayed image to another image every time the displayed image is tapped or swiped;

wherein the processor of the inventory management server is caused to also function as:

a time limit management unit which, when the merchandise basic image or the identification information image is transmitted to the user terminal, if a predetermined time limit set to corresponding merchandise has reached a predetermined threshold, causes the user terminal to superimpose and display such notice as a particular shape and color on top of and covering at least one of the merchandise basic image or the identification information image.

5. The inventory management system according to claim 1, wherein the processor of the inventory management server is caused to also function as:

an ordering management unit which acquires the identification information image of merchandise to be ordered and an order quantity of the merchandise from the user terminal and causes an order data storage unit to store the order quantity as order data in association with the identification information image.

6. The inventory management system according to claim 1, wherein the processor of the inventory management server is caused to also function as:

a registration merchandise image extraction unit which extracts the merchandise basic image or identification information image for each merchandise type from the merchandise basic image or identification information image by image analysis if the merchandise basic image or identification information image acquired by the registration data acquisition unit includes multiple types of merchandise or multiple pieces of identification information.

7. The inventory management system according to claim 1, wherein the processor of the inventory management server is caused to also function as:

a delivery merchandise image extraction unit which extracts the delivery merchandise image for each merchandise type from the delivery merchandise image by image analysis if the delivery merchandise image acquired by the delivery merchandise image acquisition unit includes multiple types of merchandise.

8. The inventory management system according to claim 3, wherein the processor of the inventory management system is caused to also function as:

an identification information text processing unit which converts the identification information included in the identification information image into text data by image analysis and causes the inventory data storage unit to store the identification information as the inventory data in association with the merchandise basic image.

9. The inventory management system according to claim 3, wherein the processor of the inventory management server is caused to also function as:

an ordering management unit which acquires the identification information image of merchandise to be ordered and an order quantity of the merchandise from the user terminal and causes an order data storage unit to store the order quantity as order data in association with the identification information image.

10. The inventory management system according to claim 3, wherein the processor of the inventory management server is caused to also function as:

a registration merchandise image extraction unit which extracts the merchandise basic image or identification information image for each merchandise type from the merchandise basic image or identification information image by image analysis if the merchandise basic image or identification information image acquired by the registration data acquisition unit includes multiple types of merchandise or multiple pieces of identification information.

11. The inventory management system according to claim 4, wherein the processor of the inventory management system is caused to also function as:

an identification information text processing unit which converts the identification information included in the identification information image into text data by image analysis and causes the inventory data storage unit to store the identification information as the inventory data in association with the merchandise basic image.

12. The inventory management system according to claim 4, wherein the processor of the inventory management server is caused to also function as:

a registration merchandise image extraction unit which extracts the merchandise basic image or identification information image for each merchandise type from the merchandise basic image or identification information image by image analysis if the merchandise basic image or identification information image acquired by the registration data acquisition unit includes multiple types of merchandise or multiple pieces of identification information.

* * * * *